United States Patent
Hiramatsu et al.

(10) Patent No.: US 8,241,725 B2
(45) Date of Patent: Aug. 14, 2012

(54) HONEYCOMB SEGMENT, HONEYCOMB STRUCTURE AND PROCESS FOR PRODUCING THE SAME

(75) Inventors: Takuya Hiramatsu, Nagoya (JP); Kenji Morimoto, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/188,957

(22) Filed: Aug. 8, 2008

(65) Prior Publication Data
US 2009/0022942 A1    Jan. 22, 2009

Related U.S. Application Data

(63) Continuation of application No. PCT/JP2007/052406, filed on Feb. 9, 2007.

(30) Foreign Application Priority Data

Feb. 10, 2006 (JP) ................................. 2006-033839

(51) Int. Cl.
  *B01J 37/00* (2006.01)
  *B32B 3/12* (2006.01)
  *F01N 3/10* (2006.01)
  *F01N 3/28* (2006.01)

(52) U.S. Cl. .................. 428/116; 428/117; 502/527.11; 502/527.12; 502/527.13; 502/527.18; 502/527.21; 502/527.23; 502/439; 422/180; 422/181; 60/299

(58) Field of Classification Search .................. 502/439, 502/527.11–527.13, 527.18, 527.19, 527.21, 502/527.23; 428/116, 117; 422/180, 181; 60/299
See application file for complete search history.

(56) References Cited

U.S. PATENT DOCUMENTS

| | | | | |
|---|---|---|---|---|
| 4,455,336 | A * | 6/1984 | Ogawa et al. | 428/116 |
| 6,242,072 | B1 * | 6/2001 | Ueda et al. | 428/116 |
| 6,596,372 | B2 * | 7/2003 | Ito et al. | 428/116 |
| 6,656,298 | B2 * | 12/2003 | Ichikawa et al. | 156/89.22 |
| 2001/0003728 | A1 * | 6/2001 | Ito et al. | 502/439 |
| 2002/0022109 | A1 * | 2/2002 | Ichikawa et al. | 428/116 |
| 2004/0037998 | A1 | 2/2004 | Noda et al. | |
| 2004/0097370 | A1 | 5/2004 | Ichikawa et al. | |
| 2004/0105956 | A1 * | 6/2004 | Ito et al. | 428/116 |
| 2004/0142145 | A1 * | 7/2004 | Hashimoto et al. | 428/116 |
| 2005/0050845 | A1 | 3/2005 | Masukawa et al. | |
| 2005/0079975 | A1 | 4/2005 | Fujita | |
| 2006/0228520 | A1 | 10/2006 | Masukawa et al. | |

FOREIGN PATENT DOCUMENTS

| | | |
|---|---|---|
| JP | A-2003-095768 | 4/2003 |
| JP | A-2003-155908 | 5/2003 |
| JP | A-2004-130176 | 4/2004 |
| JP | A-2005-144250 | 6/2005 |
| WO | WO 03/048072 A1 | 6/2003 |
| WO | WO 2005/105705 A1 | 11/2005 |

* cited by examiner

*Primary Examiner* — Stanley Silverman
*Assistant Examiner* — Diana J Liao
(74) *Attorney, Agent, or Firm* — Oliff & Berridge, PLC

(57) ABSTRACT

A honeycomb structure whose shape is composed of plural honeycomb segments being bonded integrally by means of a bonding material; the honeycomb structure having inner partition walls with plural first pores and defining respective cells serving as flow channels for exhaust gas, outer circumferential wall having second pores, and surrounding the inner partition walls, and inner partition walls having third pores and contacting with a processed outer circumferential surface becoming an outermost circumference through processing of an outer circumferential portion. A filling composition for the second pores and a filling composition for the third pores having the specified functions respectively are also provided.

17 Claims, 3 Drawing Sheets

United States Patent US 8,241,725 B2

HONEYCOMB SEGMENT, HONEYCOMB STRUCTURE AND PROCESS FOR PRODUCING THE SAME

TECHNICAL FIELD

The present invention relates to a honeycomb segment, and a honeycomb structure in which a plurality of honeycomb segments are integrally bonded by means of a bonding material. More specifically, the present invention relates to a honeycomb segment and a honeycomb structure useful as a trapping filter for exhaust gas, especially a diesel particulate filter (DPF) which traps particulate matter (particulates) or the like in the exhaust gas of a diesel engine, capable of effectively preventing generation of defects such as cracks caused by thermal stress during use and regeneration, having excellent durability, and capable of reducing cost by reducing the amount of a carried catalyst to be used if used as a catalytic converter.

BACKGROUND ART

A honeycomb structure is incorporated in an exhaust gas system or the like of a diesel engine as a trapping filter for exhaust gas as, for example, a diesel particulate filter (DPF) in order to trap and remove particulate matter contained in exhaust gas from a diesel engine or the like. Such a honeycomb structure has a problem in that, during use (when particulate matter is trapped and removed) and during regeneration (when particulate matter deposited inside a filter is burned and removed in order to reduce an increase in pressure loss caused by the particulate matter deposited inside the filter over time), a temperature rise in the whole honeycomb structure easily becomes nonuniform, and defects such as cracks are generated due to the thermal stress accompanying a local high-temperature rise. From the viewpoint of solving such a problem, there is suggested a honeycomb structure having reduced thermal stress by forming a bonded honeycomb segment body in which a plurality of honeycomb segments are integrally bonded at their bonding surfaces by means of a bonding material.

However, in such a honeycomb structure, the binding force between a honeycomb segment and the bonding material is not sufficient yet, which may become a bonding defect such as occurrence of peeling-off or cracking from the interface between them. In order to solve such a problem, there is suggested to provide an under layer or an intermediate layer between the honeycomb segment and the bonding material to improve the binding force and relax the stress at the interface (for example, refer to Patent Documents 1 and 2).

Further, if the honeycomb structure is used as a DPF to trap soot, and the DPF is regenerated, the temperature of the DPF may rise by burning of the trapped soot, and cracks may be generated due to the thermal stress caused at this time. Particularly if the porosity of the honeycomb structure is raised in order to lower the pressure loss of the DPF, thermal conductivity and heat capacity may be lowered, the temperature distribution in the honeycomb structure easily becomes nonuniform, and cracks may be generated due to the thermal stress caused at that time. Moreover, generally, in a case where the honeycomb structure is used for a catalyst carrier, a DPF, etc., a catalyst is carried in a partition wall using catalyst slurry. In this case, there is a problem in that the catalyst slurry permeates toward an outer surface from the inner surface of an outer wall, and only catalytic liquid of the slurry permeates into the bonding material, whereby the catalyst is concentrated at the interface between the outer wall and the bonding material.

[Patent Document 1] JP-A-2003-155908
[Patent Document 2] WO 2003/048072 pamphlet

DISCLOSURE OF THE INVENTION

The invention has been made in view of the aforementioned problems and aims at providing a honeycomb segment and a honeycomb structure useful as a trapping filter for exhaust gas, especially a diesel particulate filter (DPF) which traps particulate matters (particulates) or the like in the exhaust gas of a diesel engine, capable of effectively preventing generation of defects such as cracks caused by thermal stress during use and regeneration, having excellent durability, and capable of reducing cost by reducing the amount of a carried catalyst to be used if used as a catalytic converter.

In order to achieve the above object, the following honeycomb structure is provided by the invention.

[1] A honeycomb segment having a part of a whole shape constituting a honeycomb structure having a plurality of cells serving as flow channels for exhaust gas being formed between its two end faces, being capable of forming a honeycomb structure by integrally bonded by means of a bonding material; the segment having inner partition walls which define cells and contain a number of first pores therein, and an outer circumferential wall containing a number of second pores therein and being provided so as to surround the inner partition walls, and being disposed with a filling composition containing particles of a particle size capable of coming into the insides of the second pores of the outer circumferential wall and a binder capable of binding the particles and the insides of the second pores of the outer circumferential wall and/or binding the particles together being disposed inside the second pores of the outer circumferential wall.

[2] The honeycomb segment according to [1] in which the filling composition is disposed at only ends of the outer circumferential wall.

[3] The honeycomb segment according to [1] or [2] in which the particle size of the particles is $1/100$ to $1/2$ of the pore diameter of the outer circumferential wall.

[4] The honeycomb segment according to any one of [1] to [3] in which the binder exhibits its binding force by heat treatment of 800° C. or less.

[5] The honeycomb segment according to any one of [1] to [4] in which the porosity of the outer circumferential wall is smaller than the porosity of the inner partition walls.

[6] The honeycomb segment according to [5] in which the value of the ratio of the porosity of the outer circumferential wall to the porosity of the inner partition walls is 0.50 to 0.97.

[7] The honeycomb segment according to any one of [1] to [6] in which the thermal conductivity of the outer circumferential wall is larger than the thermal conductivity of the inner partition walls.

[8] The honeycomb segment according to [7] in which the value of the ratio of the thermal conductivity of the outer circumferential wall to the thermal conductivity of the inner partition walls is 1.1 or more.

[9] The honeycomb segment according to any one of [1] to [6] in which the heat capacity of the outer circumferential wall is larger than the heat capacity of the inner partition walls.

[10] The honeycomb segment according to [9] in which the value of the ratio of the heat capacity of the outer circumferential wall to the heat capacity of the inner partition walls is 1.05 or more.

[11] The honeycomb segment according to any one of [1] to [6] in which the bending strength of the outer circumferential wall is larger than the bending strength of the inner partition walls.

[12] The honeycomb segment according to [11] in which the value of the ratio of the bending strength of the outer circumferential wall to the bending strength of the inner partition walls is 1.1 or more.

[13] A process for producing the honeycomb segment according to [1] to [12], the process including disposing, inside second pores at the whole or ends of outer circumferential wall of a formed body or fired body obtained by forming kneaded clay into a honeycomb segment with a predetermined shape or by firing the obtained formed body, a filling composition containing particles of a particle size capable of coming into the second pores and a binder capable of binding particles and the insides of the second pores of the outer circumferential wall, and/or binding particles together.

[14] The process for producing a honeycomb segment according to [13] in which heat treatment is performed within a temperature range of 800 to 1400° C. under an oxygen and steam containing atmosphere during the disposition of the filling composition.

[15] The honeycomb structure formed by bonding the honeycomb segments according to any one of [1] to [12] or the honeycomb segments obtained by the process for producing a honeycomb segment according to [13] or [14].

[16] A honeycomb structure being formed by bonding integrally honeycomb segments each of which has a part of a whole shape constituting a honeycomb structure by means of a bonding material and of which outer circumference of the bonded body being processed into a predetermined shape; the honeycomb structure comprising inner partition walls containing a number of first pores and defining a plurality of cells serving as flow channels for exhaust gas between two end faces; the structure comprising an outer circumferential wall having a number of second pores and surrounding the inner partition walls, and an internal partition wall (internal partition walls of the segments contacting to the outer circumferential wall) having a number of third pores and contacting with a processed outer circumferential surface becoming an outermost circumference through processing of an outer circumferential portion, wherein a filling composition containing particles of a particle size capable of coming into the third pores, and a binder capable of binding particles and the insides of the third pores of the outer circumferential wall and/or binding particles together is disposed inside the third pores.

[17] The honeycomb structure according to [16] in which the particle size of the particles is ¹⁄₁₀₀ to ½ of the pore diameter of the inner portions of outer circumferential wall.

[18] The honeycomb structure according to [16] or [17] in which the binder exhibits its binding force by heat treatment of 800° C. or less.

[19] The honeycomb structure according to any one of [16] to [18] in which the porosity of the inner portions of outer circumferential wall is smaller than the porosity of the inner partition walls.

[20] The honeycomb structure according to [19] in which the value of the ratio of the porosity of the inner portions of outer circumferential wall to the porosity of the inner partition walls is 0.50 to 0.97.

[21] The honeycomb structure according to any one of [16] to [20] in which the thermal conductivity of the inner portions of outer circumferential wall is larger than the thermal conductivity of the inner partition walls.

[22] The honeycomb structure according to [21] in which the value of the ratio of the thermal conductivity of the inner portions of outer circumferential wall to the thermal conductivity of the inner partition walls is 1.1 or more.

[23] The honeycomb structure according to any one of [16] to [20] in which the heat capacity of the inner portions of outer circumferential wall is larger than the heat capacity of the inner partition walls.

[24] The honeycomb structure according to [23] in which the value of the ratio of the heat capacity of the inner portions of outer circumferential wall to the heat capacity of the inner partition walls is 1.05 or more.

[25] The honeycomb structure according to any one of [16] to [20] in which the bending strength of the inner portions of outer circumferential wall is larger than the bending strength of the inner partition walls.

[26] The honeycomb segment according to [25] in which the value of the ratio of the bending strength of the inner portions of outer circumferential wall to the bending strength of the inner partition walls is 1.1 or more.

[27] A process for producing the honeycomb structure according to any one of [16] to [26], comprising forming kneaded clay into the shape of the honeycomb segment or firing the obtained formed body, integrally bonding the formed body or fired body serving as the obtained honeycomb segment, processing the outer circumference of the obtained bonded body into a predetermined shape, and then disposing inside the third pores of the inner portions of outer circumferential wall a filling composition containing particles of a particle size capable of coming into the third pores and a binder capable of binding particles and the insides of the third pores of the inner portions of outer circumferential wall and/or binding particles together.

[28] A honeycomb structure being formed by bonding integrally honeycomb segments each of which has a part of a whole shape constituting a honeycomb structure by means of a bonding material and of which outer circumference of the bonded body being processed into a predetermined shape; the honeycomb structure comprising inner partition walls containing a number of first pores and defining a plurality of cells serving as flow channels for exhaust gas between two end faces; the structure comprising an outer circumferential wall having a number of second pores and surrounding the inner partition walls, and an internal partition wall (internal partition walls of the segments contacting to the outer circumferential wall) having a number of third pores and contacting with a processed outer circumferential surface becoming an outermost circumference through processing of an outer circumferential portion, wherein a filling composition containing particles of a particle size capable of coming into the second pores, and a binder capable of binding particles and the insides of the second pores of the outer circumferential wall and/or binding particles together is disposed inside the second pores at the whole or ends of the outer circumferential wall, and a filling composition containing particles of a particle size capable of coming into the third pores and a binder capable of binding particles and the insides of the third pores of the inner portions of outer circumferential wall and/or binding particles together is disposed inside the third pores of the inner portions of outer circumferential wall.

[29] The honeycomb structure according to [28] in which the particle size of the particles is ¹⁄₁₀₀ to ½ of the pore diameter of the outer circumferential wall and the pore diameter of the inner portions of outer circumferential wall.

[30] The honeycomb structure according to [28] or [29] in which the binder exhibits its binding force by heat treatment of 800° C. or less.

[31] The honeycomb structure according to any one of [28] to [30] in which the porosity of the outer circumferential wall and the porosity of the inner portions of outer circumferential wall are smaller than the porosity of the inner partition walls.

[32] The honeycomb structure according to [31] in which the value of the ratio of the porosity of the outer circumferential wall to the inner partition walls and the value of the ratio of the porosity of the inner portions of outer circumferential wall to the porosity of the inner partition walls are 0.50 to 0.97.

[33] The honeycomb structure according to any one of [28] to [32] in which the thermal conductivity of the outer circumferential wall and the thermal conductivity of the inner portions of outer circumferential wall are larger than the thermal conductivity of the inner partition walls.

[34] The honeycomb structure according to [33] in which the value of the ratio of the thermal conductivity of the outer circumferential wall to the thermal conductivity of the inner partition walls and the value of the ratio of the thermal conductivity of the inner portions of outer circumferential wall to the thermal conductivity of the inner partition walls are 1.1 or more.

[35] The honeycomb structure according to any one of [28] to [32] in which the heat capacity of the outer circumferential wall and the heat capacity of the inner portions of outer circumferential wall are larger than the heat capacity of the inner partition walls.

[36] The honeycomb structure according to [35] in which the value of the ratio of the heat capacity of the outer circumferential wall and the heat capacity of the inner portions of outer circumferential wall, and the heat capacity of the inner partition walls is 1.05 or more.

[37] The honeycomb structure according to any one of [28] to [32],
wherein the bending strength of the outer circumferential wall and the bending strength of the inner portions of outer circumferential wall are larger than the bending strength of the inner partition walls.

[38] The honeycomb structure according to [31] in which the value of the ratio of the bending strength of the outer circumferential wall to the inner partition walls and the value of the ratio of the bending strength of the inner portions of outer circumferential wall to the bending strength of the inner partition walls are 1.1 or more.

[39] The process for producing the honeycomb structure according to any one of [28] to [38], an outer circumference of the honeycomb structure according to [15] being processed into a predetermined shape; the honeycomb structure comprising inner partition walls containing a number of first pores and defining a plurality of cells serving as flow channels for exhaust gas between two end faces; the structure comprising an outer circumferential wall having a number of second pores and surrounding the inner partition walls, and an internal partition wall (internal partition walls of the segments contacting to the outer circumferential wall) having a number of third pores and contacting with a processed outer circumferential surface becoming an outermost circumference through processing of an outer circumferential portion,
wherein a filling composition containing particles of a particle size capable of coming into the third pores, and a binder capable of binding particles and the insides of the third pores of the outer circumferential wall and/or binding particles together is disposed inside the third pores.

[40] A catalytic converter in which a catalyst component is carried on the honeycomb structure according to any one of [15], [16] to [26], and [28] to [38] or on a honeycomb structure obtained by the process for producing a honeycomb structure according to [27] or [39], in which the catalyst component is absent at the inside of the bonding material, the interface between the bonding material and the honeycomb segment, the inside of the outer circumferential coat layer, and the interface between the outer circumferential coat layer and the honeycomb segment.

[41] A process for producing a catalytic converter according to [40] in which the catalyst component is carried on the portions which contact exhaust gas in the honeycomb structure according to any one of [15], [16] to [26], and [28] to [38] or in a honeycomb structure obtained by the process for producing a honeycomb structure according to [27] or [39].

As described above, according to the invention, there are provided a honeycomb segment and a honeycomb structure useful as a trapping filter for exhaust gas, especially a diesel particulate filter (DPF) which traps particulate matters (particulates) or the like in the exhaust gas of a diesel engine, capable of effectively preventing generation of defects such as cracks caused by thermal stress during use and regeneration, having excellent durability, and capable of reducing cost by reducing the amount of a carried catalyst to be used if used as a catalytic converter.

DESCRIPTION OF REFERENCE NUMERALS

Figure 1:
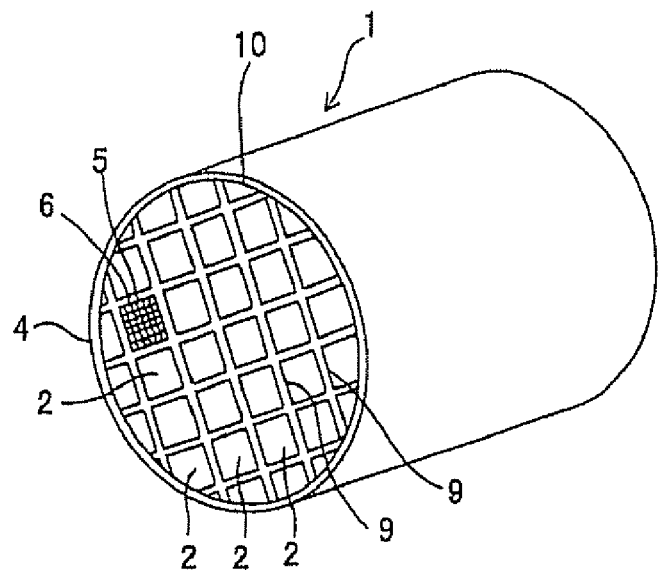
FIG. 1 is a perspective view schematically showing one embodiment (its whole cross-sectional shape when being cut along a plane perpendicular to the central axis of the honeycomb structure is a circular shape) of a honeycomb structure of the invention.

1: HONEYCOMB STRUCTURE, 2: HONEYCOMB SEGMENT, 4: OUTER CIRCUMFERENTIAL COAT LAYER, 5: CELL, 6: INNER PARTITION WALLS, 7: FILLING MATERIAL, 8: OUTER CIRCUMFERENTIAL WALL, 9: BONDING MATERIAL, 10: BONDED HONEYCOMB SEGMENT BODY, 11: INNER PARTITION WALLS CONTACTING WITH PROCESSED OUTER CIRCUMFERENTIAL SURFACE INNER PORTIONS OF OUTER CIRCUMFERENTIAL WALL)

BEST MODE FOR CARRYING OUT THE INVENTION

Hereinafter, embodiments of the invention will be described in detail. However, the invention is by no means limited to these embodiments, and various changes, modifications, and improvements may be made on the basis of the knowledge of a person having ordinary skill in the art as long as it does not deviate from the scope of the invention.

As shown in FIGS. 1 to 4, a honeycomb segment 2 of a first embodiment of the invention is a honeycomb segment 2 having a part of a whole shape constituting a honeycomb structure having a plurality of cells 5 serving as flow channels for exhaust gas being formed between its two end faces, being capable of forming a honeycomb structure 1 by integrally bonded by means of a bonding material 9; the segment having inner partition walls 6 which define cells 5 and contain a number of first pores therein, and an outer circumferential wall 8 containing a number of second pores therein and being provided so as to surround the inner partition walls, wherein a filling composition containing particles of a particle size capable of coming into the insides of the second pores of the outer circumferential wall 8 and a binder capable of binding the particles and the insides of the second pores of the outer circumferential wall 8 and/or binding the particles together is disposed inside the second pores of the outer circumferential wall.

Figure 3:
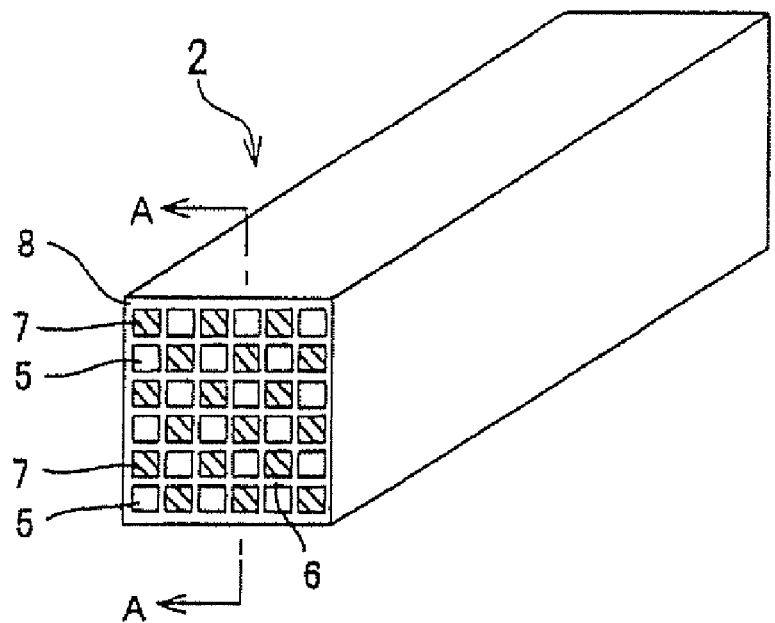
FIG. 3 is a perspective view schematically showing a honeycomb segment of the invention.
Figure 4:
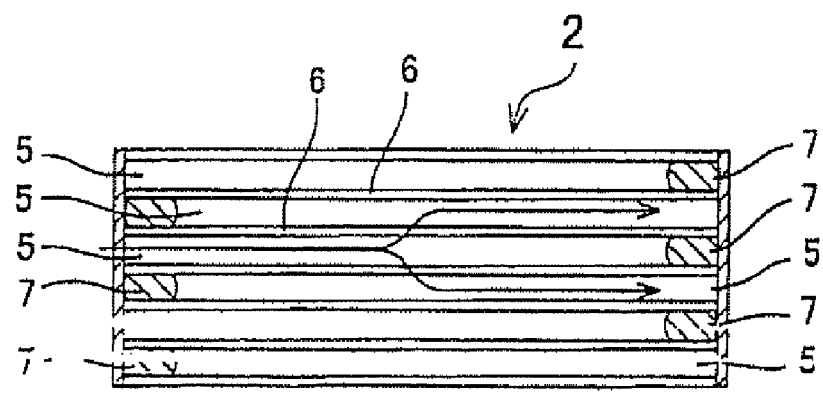
FIG. 4 is a sectional view taken along a line A-A in FIG. 3.

Such a honeycomb segment 2 can be bonded by means of a bonding material 9 to form a honeycomb structure. For example, the honeycomb structure is subjected to grinding processing so that the whole cross-sectional shape in a plane perpendicular to the central axis of the honeycomb structure 1 becomes a circular shape, an elliptical shape, or a racing track shape, or shapes obtained by modifying part of these shapes, and its outer circumferential surface is covered with an outer circumferential coat layer 4 if necessary. In a case where the honeycomb structure 1 is used as a DPF, particulate matter (particulates) containing the soot emitted from a diesel engine can be trapped as the honeycomb structure is arranged in the exhaust gas system, etc., of a diesel engine. In addition, in FIG. 1, the cells 5 and the inner partition walls 6 are shown only in one honeycomb segment 2. The respective honeycomb segments 2, as shown in FIGS. 3 and 4, have a configuration which constitutes part of the whole honeycomb structure 1 (bonded honeycomb segment body 10) (refer to FIG. 1) and have a configuration which constitutes the whole honeycomb structure as being assembled in the direction perpendicular to the central axis of the honeycomb structure 1 (refer to FIG. 1). The cells 5 are disposed so as to be parallel to each other in the direction of the central axis of the honeycomb structure 1, and respective ends in adjacent cells 5 are alternately plugged with the filling material 7.

Figure 2:
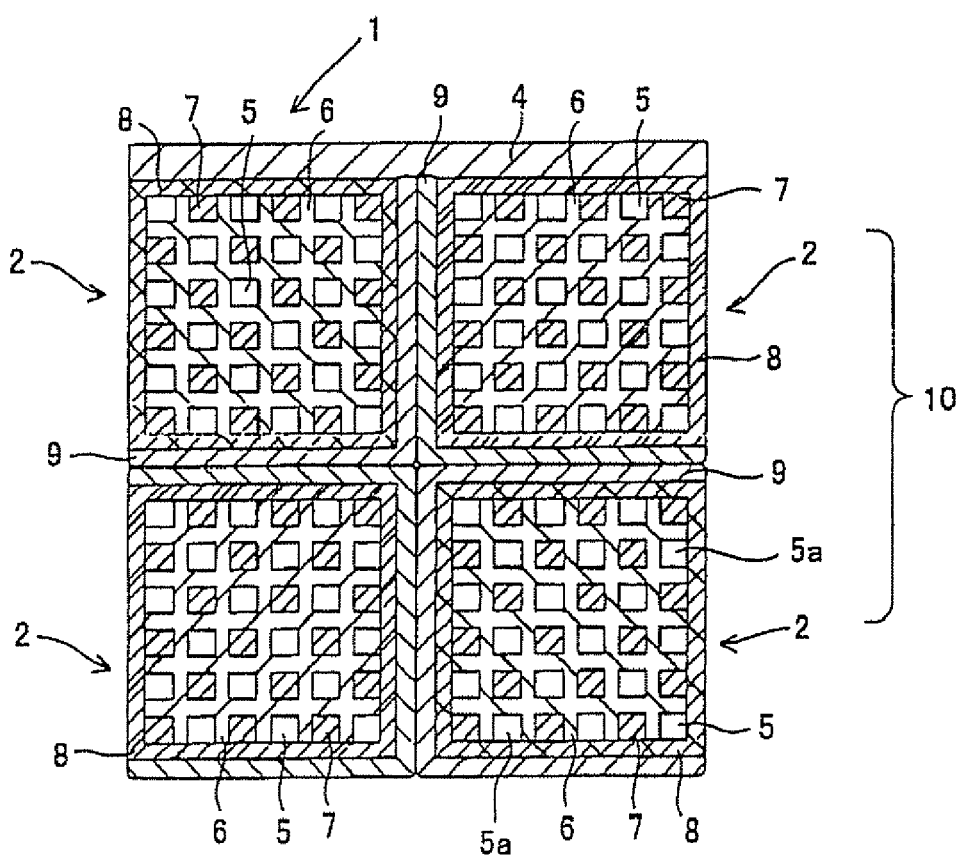
FIG. 2 is a front view when part of another embodiment (its whole cross-sectional shape when being cut along a plane perpendicular to the central axis of the honeycomb structure is a circular shape) of the honeycomb structure of the invention is seen from an end face side.

In a predetermined cell 5 (inflow cell), its left end is opened in FIGS. 3 and 4, and its right end is plugged with the filling material 7, and in another cell (outflow cell) 5 adjacent to the predetermined cell, its left end is plugged with the filling material 7, and its right end is opened. By such plugging, as shown in FIG. 2, the end faces of the honeycomb segment 2 show a checkerboard pattern. In a case where the honeycomb structure 1 in which a plurality of such honeycomb segments 2 are bonded are arranged in an exhaust gas system for exhaust gas, exhaust gas flows into the cells 5 of each honeycomb segment 2 from the left in FIG. 4 and moves to the right.

A case where the left of the honeycomb segments 2 becomes an inlet of exhaust gas is shown in FIG. 4, and the exhaust gas flows into the honeycomb segment 2 from the cells 5 (inflow cells) which are not plugged but opened. The exhaust gas which has flowed into the cells 5 (inflow cells) passes through the porous partition walls 6 and flows out of other cells 5 (outflow cells). Also, when the exhaust gas passes through the partition walls 6, particulate matter (particulates) containing the soot in the exhaust gas is trapped by the partition walls 6. In this way, the exhaust gas can be purified. By such trapping, particulate matter (particulates) containing soot is deposited in the inside of the honeycomb segment 2 over time, and pressure loss becomes large. Therefore, the regeneration of burning the soot, etc., is performed. In addition, although the honeycomb segment 2 the whole cross-sectional shape of which is square is shown in FIGS. 2 to 4, the honeycomb segment may have a rectangular shape or a shape obtained by modifying the rectangular shape, or may be a triangular shape, a hexagonal shape, etc. Further, the cross-sectional shape of the cell 5 may be a polygonal shape, a circular shape, an elliptical shape, a racing track shape, or shapes obtained by modifying part of these shapes.

As a material of the honeycomb structure 2, from the viewpoints of strength and heat resistance, it is preferable to use at least one selected from the group consisting of silicon carbide, a silicon-silicon carbide based composite material, silicon nitride, cordierite, mullite, alumina, spinel, a silicon carbide-cordierite based composite material, lithium aluminum silicate, aluminum titanate and an Fe—Cr—Al based metal. Especially, the silicon carbide or silicon-silicon carbide based composite material is preferable.

The honeycomb segment 2 in this embodiment is one including the inner partition walls 6 and the outer circumferential wall 8, a filling composition containing particles of a particle size capable of coming into the second pores of the outer circumferential wall 8 and a binder capable of binding particles and the insides of the second pores of the outer circumferential wall, and/or binding particles together being disposed inside the second pores of the outer circumferential wall. In addition, here, the outer circumferential wall 8 means walls which are arranged so as to surround the inner partition walls 6 and which surround outermost circumferential cells 5a of the cells 5 of the honeycomb segment 2.

By adopting this configuration, the portion of the outer circumferential wall 8 in the honeycomb segment 2 which does not contribute to trapping of soot can be filled with a filling composition composed of particles and a binder, and high thermal conductivity, high temperature capacity, and high strength can be achieved. From this, generation of cracks during production of a honeycomb structure can be suppressed, or generation of cracks by the thermal stress caused during regeneration of soot can be suppressed. Similarly, by filling a processed outer circumferential surface of the honeycomb structure to be described later with a filling composition and achieving high thermal conductivity, high temperature capacity, and high strength, generation of cracks by the thermal stress caused during regeneration of soot can be suppressed. Further, by filling (modifying) the outer circumferential wall or the processed outer circumferential surface of the honeycomb structure with a filling composition, permeation from the inner surface of an outer wall of catalyst slurry into the outer surface thereof during carrying of a catalyst can be suppressed, and concentration of a catalyst component at the interface between the outer wall and a bonding layer can be suppressed. By such suppressing of the concentration of the catalyst component, suppressing of cracks beginning at a catalyst layer, and cost reduction by reduction of the amount of catalyst to be used become possible.

The filling composition may include the same material as one selected from the aforementioned materials, and may include different materials. In a case where the filling material include different materials, for example, a material suitable as the material of the honeycomb segment can be suitably selected from the viewpoints of strength, heat resistance, and thermal conductivity, like silicon carbide, a silicon-silicon carbide based composite material, silicon nitride, cordierite, mullite, alumina, spinel, a silicon carbide-cordierite based composite material, lithium aluminum silicate, aluminum titanate and an Fe—Cr—Al based metal.

In the filling composition to be used in this embodiment, "particles" having a particle size capable of coming into the insides of the second pores may include inorganic particles such as SiC and alumina powder, oxide fibers such as aluminosilicate fibers, glass particles, etc. Further, the "binder" capable of binding particles and the insides of the second pores of the outer circumferential wall 8, and/or binding particles together may include, for example, colloidal oxides such as a silica sol aqueous solution and laminated clay compounds such as montmorillonite. Although the compounding ratio of the filling composition changes depending on the kinds of "particles" and "binder", the material of a honeycomb segment to be modified, and pore diameters, it is sufficient to provide such amount that particles and the insides of the pores of the outer circumferential wall can be bound and/or particles can be bound together. The filling composition can be prepared by mixing the aforementioned particles and binder together, adding water, and stirring the resulting mixture for about 30 minutes using a mixer. Further, during preparation, a dispersant and an antifoaming agent can be suitably added.

In this embodiment, it is preferable that the particle size of the particles be $1/100$ to $1/2$ of the pore diameter of the outer circumferential wall 8. If the particle size is less than $1/100$, the particles to be filled is too small for the pore diameter and cannot be sufficiently filled into the pores (unable to capture and liable to pass through the pores), and if the particle size exceeds $1/2$, the particles to be filled are too large for the pore diameter, and cannot be filled into the pores (enter the pores).

Further, in this embodiment, it is preferable from the viewpoint of energy saving that the binder exhibits its binding force by heat treatment of 800° C. or less. Particularly, the honeycomb segment of the embodiment is used by combining a plurality of honeycomb segments and processing their outer circumferential portions into a predetermined shape, and then coating the outer circumference for integration. Particularly if the binding force is exhibited at a temperature below the curing temperature of an outer circumference coating material, heat treatment of outer circumference coating treatment for modification and integration can be performed simultaneously.

Further, in this embodiment, it is preferable from the viewpoints of an improvement in thermal conductivity, an improvement in heat capacity, and an improvement in strength of the outer circumferential wall that the porosity of the outer circumferential wall 8 be smaller than the porosity of the inner partition walls 6.

Further, in this embodiment, it is preferable from the viewpoints of an improvement in thermal conductivity, an improvement in heat capacity, and an improvement in strength of the outer circumferential wall that the value of the ratio of the porosity of the outer circumferential wall 8 to the porosity of the inner partition walls 8 be 0.50 to 0.97. If the value of the ratio of the porosity of the outer circumferential wall 8 to the porosity of the inner partition walls 8 is larger than 0.97, the effect by modification is not exhibited, and in order to make the value smaller than 0.50, multiple times of slurry coating and heat treatment are required. As a result, since a large amount of labor is required for modification, this is not preferable. In addition, in order to perform modification, it is preferable to use slurry obtained by diluting "particles" and a "binder" in water. In order to fill the "particles" and the "binder" into the pores of the outer circumferential wall, it is necessary to give fluidity to them, and, in order to make the value of the ratio of the porosity of the outer circumferential wall 8 to the porosity of the inner partition walls 8 smaller than 0.50, multiple times of heat treatment and modification are required, and a large amount of labor is required.

Further, it is preferable from the viewpoint of suppressing generation of cracks by the thermal stress caused during regeneration of soot that the thermal conductivity of the outer circumferential wall 8 be larger than the thermal conductivity of the inner partition walls 6. In order to obtain such a configuration, making the porosity of the outer circumferential wall 8 smaller than the porosity of the inner partition walls 6 can be mentioned. Further, using particles with high thermal conductivity as the filling composition can be mentioned.

Further, in this embodiment, it is preferable from the viewpoint of suppressing generation of cracks by the thermal stress caused during regeneration of soot that the value of the ratio of the thermal conductivity of the outer circumferential wall 8 to the thermal conductivity of the inner partition walls 6 be 1.1 or more. In order to obtain such a configuration, setting the value of the ratio of the porosity of the outer circumferential wall 8 to the porosity of the inner partition walls 6 to 0.50 to 0.97 can be mentioned.

Further, it is preferable from the viewpoint of suppressing generation of cracks by the thermal stress caused during regeneration of soot that the heat capacity of the outer circumferential wall 8 be larger than the heat capacity of the inner partition walls 6. In order to obtain such a configuration, making the porosity of the outer circumferential wall 8 smaller than the porosity of the inner partition walls 6 can be mentioned. Further, as the method of increasing heat capacity, filling particles with high density can be used, or filling particles with high specific heat can be used.

Further, in this embodiment, it is preferable from the viewpoint of suppressing generation of cracks by the thermal stress caused during regeneration of soot that the value of the ratio of the heat capacity of the outer circumferential wall 8 to the heat capacity of the inner partition walls 6 be 1.05 or more. In order to obtain such a configuration, setting the value of the ratio of the porosity of the outer circumferential wall 8 to the porosity of the inner partition walls 6 to 0.50 to 0.97 can be mentioned.

Further, it is preferable from the viewpoint of suppressing generation of cracks by the thermal stress caused during regeneration of soot that the bending strength of the outer circumferential wall 8 be larger than the bending strength of the inner partition walls 6. In order to obtain such a configuration, making the porosity of the outer circumferential wall 8 smaller than the porosity of the inner partition walls 6 can be mentioned.

Further, in this embodiment, it is preferable from the viewpoint of suppressing generation of cracks by the thermal stress caused during regeneration of soot that the value of the ratio of the bending strength of the outer circumferential wall 8 to the bending strength of the inner partition walls 6 be 1.1 or more. In order to obtain such a configuration, setting the value of the ratio of the porosity of the outer circumferential wall 8 to the porosity of the inner partition walls 6 to 0.50 to 0.97 can be mentioned.

A process for producing a honeycomb segment which is a second embodiment of the invention is a process for producing the honeycomb segment which is the first embodiment, the processing including disposing, inside second pores of outer circumferential wall 8 of a formed body or fired body obtained by forming kneaded clay into a honeycomb segment 1 with a predetermined shape or by firing the obtained formed body, a filling composition containing particles of a particle size capable of coming into the second pores of the outer circumferential wall and a binder capable of binding particles and the insides of the second pores of the outer circumferential wall, and/or binding particles together. Specifically, the honeycomb segment can be produced by adding a binder such as methyl cellulose, hydroxypropoxyl cellulose, hydroxyethyl cellulose, carboxymethyl cellulose, and polyvinyl alcohol, a surfactant, and water or the like as a solvent to a material suitably selected from the aforementioned materials to obtain clay having plasticity; subjecting the clay to extrusion forming so as to give the aforementioned shape; drying by microwaves, hot air, or the like and then sintering the formed body; coating the aforementioned filling composition on the outer circumferential wall 8 of the obtained sintered body and drying the composition so as not to remain on the outer circumferential wall 8; and subjecting the coated and dried body to heat treatment of about 700° C.

As the filling material 7 used for plugging of the cells 5, the same material as the honeycomb segment 2 can be used. The plugging by the filling material 7 can be performed by immersing the end faces of the honeycomb segment 2 in the slurried filling material 7, and thereby filling the open cells 5 with the filling material, in a state where the cells 5 on which plugging is not to be performed are masked. Although filling of the filling material 7 may be performed before or after firing after forming of the honeycomb segment 2, it is more preferable to perform the filling before firing since a firing step is completed at a time.

In addition, the method of applying a modifying material is not particularly limited. For example, a spray method; coating by a roller, a brush, a writing brush, etc.; a dipping method, etc., can be applied. Further, in order to form a bonding layer and an outer circumferential coat layer in the next step and bond these layers and a honeycomb segment strongly, it is preferable to remove an excess modifying material so as not to exist in the other portions than modified portions (internal partition wall (inner portions of outer circumferential wall) which become an outermost circumference through processing in the segment outer circumferential wall). By removing the excess modifying material, it becomes possible to show sufficient strength during bonding by virtue of an anchor effect.

The honeycomb structure 1 of a third embodiment of the invention is obtained by bonding the honeycomb segment 2 of the first embodiment in which the outer circumferential wall 8 is modified or the honeycomb segment 2 which is obtained by the producing process of the second embodiment and in which the outer circumferential wall 8 is modified by means of the bonding material 9.

Specifically, a slurried bonding material 9 is applied on the outer circumferential surface of the honeycomb segment 2 in which the outer circumferential wall 8 is modified, a plurality of honeycomb segments 2 are assembled so as to give a predetermined solid shape (whole structure of the honeycomb structure 1), and the assembled honeycomb segments are pressure-bonded and are then heated and dried. In this way, a bonded body 10 in which a plurality of honeycomb segments 2 are bonded integrally is prepared. Thereafter, the honeycomb structure 1 shown in FIG. 2 is prepared by covering the outer circumferential surface of the bonded body 10 with the outer circumferential coat layer 4. Further, the honeycomb structure 1 shown in FIG. 1 can also be prepared, if necessary, by grinding the outer circumference of the bonded body 10 into a predetermined shape and by covering its outer circumferential surface with the outer circumferential coat layer 4.

The bonding material 9 to be used in the invention is applied to the outer circumferential surfaces of the honeycomb segments 2 to function to bond the honeycomb segments 2. Specifically, the formation of the bonded body 10 may include, for example, applying a slurried bonding material 9 on the outer circumferential surfaces of the honeycomb segments 2, assembling a plurality of honeycomb segments 2 so as to give a predetermined solid shape (whole structure of the honeycomb structure 1), and pressure-bonding and then heating and drying the assembled honeycomb segments after the preparation of the honeycomb segments 2. In this case, although coating may be performed on the outer circumferential surface of each of the honeycomb segments 2 which are adjacent to each other, the coating may be performed only on one of corresponding outer circumferential surfaces between the adjacent honeycomb segments 2. Further, since a filling composition is filled into the outer circumferential wall 8 of the honeycomb segments 2 to improve strength, when the honeycomb segments 2 are assembled so as to give a predetermined solid shape, a honeycomb structure can be obtained without causing breakage of the segments, etc., even if the segments are coated with a bonding material, are pressure-bonded with a strong load, and are heated and dried.

Suitable examples of the bonding material 9 to be used in this embodiment may include ones consisting of inorganic fibers, an inorganic binder, an organic binder, and inorganic particles. Specifically, the inorganic fibers may include, for example, oxide fibers, such as aluminosilicate and alumina, other fibers (for example, SiC fibers), etc. The inorganic binder may include, for example, silica sol, alumina sol, clay, etc. The organic binder may include, for example, polyvinyl alcohol (PVA), carboxymethyl cellulose (CMC), methyl cellulose (MC), etc. The inorganic particles may include, for example, ceramics, such as silicon carbide, silicon nitride, cordierite, alumina, and mullite.

The outer circumferential coat layer 4 is applied to the outer circumferential surface of the bonded body (bonded body 10) of the honeycomb segments 2 to function to protect the outer circumferential surface of the bonded body of the honeycomb segments 2. The thickness of the outer circumferential coat layer 4 is suitably selected within a range of, for example, 0.1 to 1.5 mm. The outer circumferential coat layer 4 can be dried and cured by heat treatment after coating, thereby obtaining a honeycomb structure.

The honeycomb structure 1 of a fourth embodiment of the invention is a honeycomb structure being formed by bonding integrally honeycomb segments 2 (in which outer circumferential wall 8 are not modified) each of which has a part of a whole shape constituting a honeycomb structure by means of a bonding material 9 and of which outer circumference of the bonded body being processed into a predetermined shape; the honeycomb structure comprising inner partition walls 6 containing a number of first pores and defining a plurality of cells 5 serving as flow channels for exhaust gas between two end faces; the structure comprising an outer circumferential wall 8 having a number of second pores and surrounding the inner partition walls 6, and an internal partition wall 11 (internal partition walls of the segments contacting to the outer circumferential wall) having a number of third pores and contacting with a processed outer circumferential surface becoming an outermost circumference through processing of an outer circumferential wall 8, wherein a filling composition containing particles of a particle size capable of coming into the third pores of the internal partition wall 11 and a binder capable of binding particles and the insides of the third pores and/or binding particles together is disposed inside the third pores of internal partition wall 11.

Figure 5:
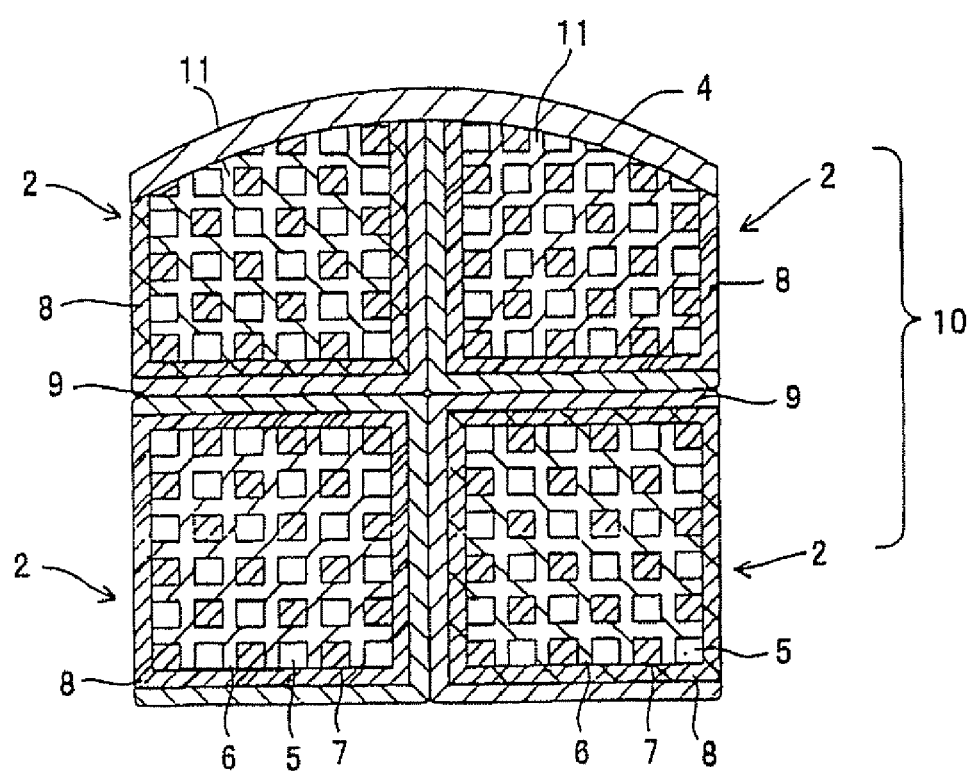
FIG. 5 is a front view when part of still another embodiment (its whole cross-sectional shape when being cut along a plane perpendicular to the central axis of the honeycomb structure is a circular shape) of the honeycomb structure of the invention is seen from an end face side.

That is, the honeycomb structure 1 of the aforementioned third embodiment is configured by bonding the honeycomb segments 2 in which the outer circumferential wall 8 are modified by means of the bonding material 9, while the honeycomb structure 1 of the fourth embodiment has a difference in that the honeycomb segments 2 in which the outer circumferential wall 8 are not modified are bonded by means of the bonding material 9, and then, the internal partition wall (inner portions of outer circumferential wall) 11 becoming an outermost circumference are modified through processing of the outer circumferential portion, but is similar to the honeycomb structure 1 of the third embodiment in terms of other configurations. The configuration of the honeycomb structure 1 of the fourth embodiment is shown in FIG. 5. Further, the inner portions of outer circumferential wall 11 mean inner partition walls contacting with a processed outer circumferential surface becoming an outermost circumference through processing of the outer circumferential portion of the bonded body 10, and remaining inner partition walls where cells (four sides are surrounded by the inner partition walls) have not been formed through outer circumference processing.

In this embodiment, it is preferable that the particle size of the particles be 1/100 to 1/2 of the pore diameter of the inner portions of outer circumferential wall 11. If the particle size is less than 1/100, the particles to be filled is too small for the pore diameter and cannot be sufficiently filled into the pores (unable to capture and liable to pass through the pores), and if the particle size exceeds 1/2, the particles to be filled are too large for the pore diameter and cannot be filled into the pores (enter the pores).

Further, in this embodiment, it is preferable from the viewpoint of energy saving that the binder exhibits its binding force by heat treatment of 800° C. or less. Particularly, the honeycomb segment of the embodiment is used by combining a plurality of honeycomb segments and processing their outer circumferential portions into a predetermined shape, and then coating the outer circumference for integration. Particularly if the binding force is exhibited at a temperature below the curing temperature of an outer circumference coating material, heat treatment of outer circumference coating treatment for modification and integration can be performed simultaneously.

Further, in this embodiment, it is preferable from the viewpoints of an improvement in thermal conductivity, an improvement in heat capacity, and an improvement in strength of the inner portions of outer circumferential wall that the porosity of the inner portions of outer circumferential wall 11 be smaller than the porosity of the inner partition walls 6.

Further, in this embodiment, it is preferable from the viewpoints of an improvement in thermal conductivity and an improvement in strength of the inner portions of outer circumferential wall that the value of the ratio of the porosity of the inner portions of outer circumferential wall 11 to the porosity of the inner partition walls 6 be 0.50 to 0.97. If the value of the ratio of the porosity of the inner portions of outer circumferential wall 11 to the porosity of the inner partition walls 6 is larger than 0.97, the effect by modification is not exhibited, and in order to make the value smaller than 0.50, multiple times of slurry coating and heat treatment are required. As a result, since a large amount of labor is required for modification, this is not preferable. In addition, in order to perform the modification, it is preferable to use slurry obtained by diluting "particles" and a "binder" in water. In order to fill the "particles" and the "binder" into the pores of the outer circumferential wall, it is necessary to give fluidity to them, and in order to make the value of the ratio of the porosity of the inner portions of outer circumferential wall 11 to the porosity of the inner partition walls 6 smaller than 0.50, multiple times of heat treatment, and modification are required, and a large amount of labor is required.

Further, it is preferable from the viewpoint of suppressing generation of cracks by the thermal stress caused during regeneration of soot that the thermal conductivity of the inner portions of outer circumferential wall 11 be larger than the thermal conductivity of the inner partition walls 6. In order to obtain such a configuration, making the porosity of the inner portions of outer circumferential wall 11 smaller than the porosity of the inner partition walls 6 can be mentioned. Further, using particles with high thermal conductivity as the filling composition can be mentioned.

Further, in this embodiment, it is preferable from the viewpoint of suppressing generation of cracks by the thermal stress caused during regeneration of soot that the value of the ratio of the thermal conductivity of the inner portions of outer circumferential wall 11 to the thermal conductivity of the inner partition walls 6 be 1.1 or more. In order to obtain such a configuration, setting the value of the ratio of the porosity of the inner portions of outer circumferential wall 11 to the porosity of the inner partition walls 6 to 0.50 to 0.97 can be mentioned.

Further, it is preferable from the viewpoint of suppressing generation of cracks by the thermal stress caused during regeneration of soot that the heat capacity of the inner portions of outer circumferential wall 11 be larger than the heat capacity of the inner partition walls 6. In order to obtain such a configuration, making the porosity of the inner portions of outer circumferential wall 11 smaller than the porosity of the inner partition walls 6 can be mentioned. Further, as the method of increasing heat capacity, filling particles with large density can be used, or filling particles with high specific heat can be used.

Further, in this embodiment, it is preferable from the viewpoint of suppressing generation of cracks by the thermal stress caused during regeneration of soot that the value of the ratio of the heat capacity of the inner portions of outer circumferential wall 11 to the heat capacity of the inner partition walls 6 be 1.05 or more. In order to obtain such a configuration, setting the value of the ratio of the porosity of the inner portions of outer circumferential wall 11 to the porosity of the inner partition walls 6 to 0.50 to 0.97 can be mentioned.

Further, it is preferable from the viewpoint of suppressing generation of cracks by the thermal stress caused during regeneration of soot that the bending strength of the inner portions of outer circumferential wall 11 be larger than the bending strength of the inner partition walls 6. In order to obtain such a configuration, making the porosity of the inner portions of outer circumferential wall 11 smaller than the porosity of the inner partition walls 6 can be mentioned.

Further, in this embodiment, it is preferable from the viewpoint of suppressing generation of cracks by thermal stress caused during regeneration of soot that the value of the ratio of the bending strength of the inner portions of outer circumferential wall 11 to the bending strength of the inner partition walls 6 be 1.1 or more. In order to obtain such a configuration, setting the value of the ratio of the porosity of the inner portions of outer circumferential wall 11 to the porosity of the inner partition walls 6 to 0.50 to 0.97 can be mentioned.

A process for producing a honeycomb structure which is a fifth embodiment of the invention is a process for producing the honeycomb structure which is the fourth embodiment, the process including forming clay into the shape of the honeycomb segment 2 or firing the obtained formed body, integrally bonding the formed body or fired body serving as the obtained honeycomb segment 2 (a honeycomb segment 2 in which the outer circumferential wall 8 is not modified, which will be used in the fourth embodiment), processing the outer circumference of the obtained bonded body into a predetermined shape, and then disposing a filling composition containing particles of a particle size capable of coming into the third pores and a binder capable of binding particles and the insides of the third pores of the inner portions of outer circumferential wall 11, and/or binding particles together, inside the third pores of the inner portions of outer circumferential wall 11 contacting with a processed outer circumferential surface becoming an outermost circumference through processing of the outer circumferential portion.

That is, the process for producing a honeycomb structure of the aforementioned second embodiment is a process of bonding the honeycomb segments 2 in which the outer circumferential wall 8 are modified by means of the bonding material 9, while the process for producing a honeycomb structure of the fifth embodiment has a difference in that the honeycomb segments 2 in which the outer circumferential wall 8 are not modified are bonded by means of the bonding material 9, and then, the internal partition wall (inner portions of outer circumferential wall) 11 becoming an outermost circumference are modified through processing of the outer circumferential portion, but is similar to the process for producing a honeycomb structure of the second embodiment in terms of the other configurations.

The honeycomb structure 1 of a sixth embodiment of the invention is a honeycomb structure 1 produced from a honeycomb structure according to the embodiment 3 (the honeycomb segments 2 of which outer circumferential wall 8 is modified are used) by processing its outer circumferential wall into a predetermined shape so as to have a honeycomb structure comprising inner partition walls 6 containing a number of first pores and defining a plurality of cells 5 serving as flow channels for exhaust gas between two end faces; the structure comprising an outer circumferential wall 8 having a number of second pores and surrounding the inner partition walls 6, and an internal partition wall (internal partition walls of the segments contacting to the outer circumferential wall) 11 having a number of third pores and contacting with a processed outer circumferential surface becoming an outermost circumference through processing of an outer circumferential portion, wherein a filling composition containing particles of a particle size capable of coming into the second pores, and a binder capable of binding particles and the insides of the second pores of the outer circumferential wall 8 and/or binding particles together is disposed inside the second pores of the outer circumferential wall 8, and a filling composition containing particles of a particle size capable of coming into the third pores and a binder capable of binding particles and the insides of the third pores of the inner portions of outer circumferential wall 11 and/or binding particles together is disposed inside the third pores of the inner portions of outer circumferential wall 11.

That is, the honeycomb structure 1 of the aforementioned fourth embodiment is configured by bonding the honeycomb segments 2 in which the outer circumferential wall 8 are not modified by means of the bonding material 9, and then modifying the inner partition walls 11 becoming an outermost circumference through processing of the outer circumferential portion, while the honeycomb structure 1 of the sixth embodiment has a difference in that the internal partition walls (inner portions of outer circumferential wall) 11 becoming an outermost circumference are further modified through processing the outer circumferential portion of a honeycomb structure configured by bonding the honeycomb segments 2 in which the outer circumferential wall 8 are modified by means of the bonding material 9 but is similar to the honeycomb structure 1 of the fourth embodiment in terms of the other configurations. Referring to FIG. 5, there is a difference only in that the outer circumferential wall 8 are not modified in the honeycomb structure 1 of the fourth embodiment, but the outer circumferential wall 8 are modified in the honeycomb structure 1 of the sixth embodiment.

In this embodiment, it is preferable that the particle size of the particles be $1/100$ to $1/2$ of the pore diameter of the outer circumferential wall 8 and the pore diameter of the inner portions of outer circumferential wall 11. If the particle size is less than $1/100$, the particles to be filled is too small for the pore diameter, and cannot be sufficiently filled into the pores (unable to capture and liable to pass through the pores), and if the particle size exceeds $1/2$, the particles to be filled are too large for the pore diameter and cannot be filled into the pores (enter the pores).

Further, in this embodiment, it is preferable from the viewpoint of energy saving that the binder exhibits its binding force by heat treatment of 800° C. or less. Particularly, the honeycomb segment of the embodiment is used by combining a plurality of honeycomb segments and processing their outer circumferential portions into a predetermined shape, and then coating the outer circumference for integration. Particularly if the binding force is exhibited at a temperature below the curing temperature of an outer circumference coating material, heat treatment of outer circumference coating treatment for modification and integration can be performed simultaneously.

Further, in this embodiment, it is preferable from the viewpoints of an improvement in thermal conductivity, and an improvement in strength of the outer circumferential wall 8 and the inner portions of outer circumferential wall 11 that the porosity of the outer circumferential wall 8 and the inner portions of outer circumferential wall 11 be smaller than the porosity of the inner partition walls 6.

Further, in this embodiment, it is preferable from the viewpoints of an improvement in thermal conductivity, an improvement in heat capacity, and an improvement in strength of the outer circumferential wall 8 and the inner portions of outer circumferential wall 11 that the value of the ratio of the porosity of the outer circumferential wall 8 to the porosity of the inner partition walls 6 and the value of the ratio of the porosity of the inner portions of outer circumferential wall 11 to the porosity of the inner partition walls 6 be 0.50 to 0.97. If the value of the ratio of the porosity of the outer circumferential wall 8 to the porosity of the inner partition walls 6 and the value of the ratio of the porosity of the inner portions of outer circumferential wall 11 to the porosity of the inner partition walls 6 are larger than 0.97, the effect by modification is not exhibited, and, in order to make the value smaller than 0.50, multiple times of slurry coating and heat treatment are required. As a result, since a large amount of labor is required for modification, this is not preferable. In addition, in order to perform the modification, it is preferable to use slurry obtained by diluting "particles" and a "binder" in water. In order to fill the "particles" and the "binder" into the pores of the outer circumferential wall, it is necessary to give fluidity to them, and, in order to make the value of the ratio of the porosity of the outer circumferential wall 8 to the porosity of the inner partition walls 6 and the value of the ratio of the porosity of the inner portions of outer circumferential wall 11 to the porosity of the inner partition walls 6 smaller than 0.50, multiple times of heat treatment, and modification are required, and a large amount of labor is required.

Further, it is preferable from the viewpoint of suppressing generation of cracks by the thermal stress caused during regeneration of soot that the thermal conductivity of the outer circumferential wall 8 and the inner portions of outer circumferential wall 11 be larger than the thermal conductivity of the inner partition walls 6. In order to obtain such a configuration, making the porosity of the outer circumferential wall 8 and the inner portions of outer circumferential wall 11 smaller than the porosity of the inner partition walls 6 can be mentioned. Further, using particles with high thermal conductivity as the filling composition can be mentioned.

Further, in this embodiment, it is preferable from the viewpoint of suppressing generation of cracks by the thermal stress caused during regeneration of soot that the value of the ratio of the thermal conductivity of the outer circumferential wall 8 to the thermal conductivity of the inner partition walls 6 and the value of the ratio of the thermal conductivity of the inner portions of outer circumferential wall 11 to the thermal conductivity of the inner partition walls 6 be 1.1 or more. In order to obtain such a configuration, setting the value of the ratio of the porosity of the outer circumferential wall 8 to the porosity of the inner partition walls 6 and the value of the ratio of the porosity of the inner portions of outer circumferential wall 11 to the porosity of the inner partition walls 6 to 0.50 to 0.97 can be mentioned.

Further, it is preferable from the viewpoint of suppressing generation of cracks by the thermal stress caused during regeneration of soot that the heat capacity of the outer circumferential wall 8 and the inner portions of outer circumferential wall 11 be larger than the heat capacity of the inner partition walls 6. In order to obtain such a configuration, making the porosity of the outer circumferential wall 8 and the inner portions of outer circumferential wall 11 smaller than the porosity of the inner partition walls 6 can be mentioned. Further, as the method of increasing heat capacity, filling particles with high density can be used, or filling particles with high specific heat can be used.

Further, in this embodiment, it is preferable from the viewpoint of suppressing generation of cracks by the thermal stress caused during regeneration of soot that the value of the ratio of the heat capacity of the outer circumferential wall 8 and the inner portions of outer circumferential wall 11 to the heat capacity of the inner partition walls 6 be 1.05 or more. In order to obtain such a configuration, setting the value of the ratio of the porosity of the outer circumferential wall 8 and the inner portions of outer circumferential wall 11 to the porosity of the inner partition walls 6 to 0.50 to 0.97 can be mentioned.

Further, it is preferable from the viewpoint of suppressing generation of cracks by the thermal stress caused during regeneration of soot that the bending strength of the outer circumferential wall 8 and the inner portions of outer circumferential wall 11 be larger than the bending strength of the inner partition walls 6. In order to obtain such a configuration, making the porosity of the outer circumferential wall 8 and the inner portions of outer circumferential wall 11 smaller than the porosity of the inner partition walls 6 can be mentioned.

Further, in this embodiment, it is preferable from the viewpoint of suppressing generation of cracks by the thermal stress caused during regeneration of soot that the value of the ratio of the bending strength of the outer circumferential wall 8 to the bending strength of the inner partition walls 6 and the value of the ratio of the bending strength of the inner portions of outer circumferential wall 11 to the bending strength of the inner partition walls 6 be 1.1 or more. In order to obtain such a configuration, setting the value of the ratio of the porosity of the inner portions of outer circumferential wall 11 to the porosity of the inner partition walls 6 to 0.50 to 0.97 can be mentioned.

A process for producing a honeycomb structure which is a seventh embodiment is a process for producing a honeycomb structure according to the sixth embodiment (the honeycomb segments 2 of which outer circumferential wall 8 is modified are used) by processing its outer circumferential wall into a predetermined shape so as to have a honeycomb structure comprising inner partition walls 6 containing a number of first pores and defining a plurality of cells 5 serving as flow channels for exhaust gas between two end faces; the structure comprising an outer circumferential wall 8 having a number of second pores and surrounding the inner partition walls 6, and an internal partition wall (internal partition walls of the segments contacting to the outer circumferential wall) 11 having a number of third pores, wherein a filling composition containing particles of a particle size capable of coming into the second pores, and a binder capable of binding particles and the insides of the second pores of the outer circumferential wall 8 and/or binding particles together is disposed inside the second pores of the outer circumferential wall 8, and a filling composition containing particles of a particle size capable of coming into the third pores and a binder capable of binding particles and the insides of the third pores of the inner portions of outer circumferential wall 11 and/or binding particles together is disposed inside the third pores of the inner portions of outer circumferential wall 11.

That is, the process for producing a honeycomb structure of the aforementioned fifth embodiment is a process of bonding the honeycomb segments 2 in which the outer circumferential walls 8 are not modified by means of the bonding material 9, thereafter modifying the internal partition walls (inner portions of outer circumferential partition walls) 11 becoming an outermost circumference through processing of the outer circumferential portion, while the process for processing a honeycomb structure of the seventh embodiment has a difference in that the honeycomb segments 2 in which the outer circumferential walls 8 are modified are bonded, and thereafter the internal partition walls (inner portions of outer circumferential partition walls) 11 becoming an outermost circumference through processing the outer circumferential portion are modified but is similar to the process for producing a honeycomb structure of the fifth embodiment in terms of the other configurations.

In addition, in the invention, as described above, the honeycomb segment which exhibits its binding force at a heat treatment temperature of 800° C. or less is suggested, but it is also effective to set the heat treatment temperature to 800° C. to 1400° C. This is because the crystal phase of a binder component changes, and the strength of a modified portion can be further increased by setting the heat treatment temperature to 800° C. to 1400° C. Further, since the heat treatment within a temperature range of 800° C. to 1400° C. can also serve as an oxidation treatment step as will be hereinafter described, in a case where the honeycomb segment is modified, the treatment is also preferable from the viewpoint of energy saving.

As for the oxidation treatment, a method of interposing a layer containing oxide including silicon on the surface of a porous honeycomb structure such that a silicon carbide catalyst body in which a catalyst containing alumina or ceria is carried in a silicon carbide honeycomb structure is not whitened or damaged even if being exposed to a high temperature during regeneration, etc., is suggested as a silicon carbide catalyst body and its producing process having excellent thermal resistance. Specifically, the above layer can be formed by performing heat treatment within a temperature range of 800 to 1400° C. under an oxygen and steam containing atmosphere.

A catalytic converter (not shown) which is an eighth embodiment of the invention is a catalytic converter in which a catalyst component is carried on one of the aforementioned honeycomb structures, or a honeycomb structure obtained by one of the aforementioned processes for producing a honeycomb structure. Here, the catalyst component is carried so as not to be present at the inside of the bonding material 9, the interface between the bonding material 9 and the honeycomb segment 2, the inside of the outer circumferential coat layer 4, and the interface between the outer circumferential coat layer 4 and a segment becoming an outer circumference through processing. By adopting such a configuration, carrying of a catalyst on the portions which are not exposed to exhaust gas in actual use can be suppressed, cost reduction by a reduction in the amount to be used and the prevention of concentration of a catalyst components at the interface between the outer wall and a bonding material can be attained, and generation of cracks originating on a concentrated portion of the catalysts can be suppressed. Specific examples of the catalysts may include (1) a three way catalyst for purification of exhaust gas of a gasoline engine, (2) an oxidation catalyst for purification of exhaust gas of a gasoline engine or diesel engine, (3) an SCR catalyst for selective reduction of $NO_X$, (4) an $NO_x$ storage catalyst, etc.

The three way catalyst for purification of exhaust gas of a gasoline engine includes a carrier coat, which covers the partition walls of a honeycomb structure (honeycomb carrier), and a noble metal which is dispersed and carried inside this carrier coat. The carrier coat is constituted by, for example, activated alumina. Further, as the noble metal which is dispersed and carried inside the carrier coat, Pt, Rh, or Pd, or combinations thereof can be mentioned as suitable examples. Moreover, for example, compounds such as cerium oxide, zirconium oxide, and silica, or mixtures obtained by combinations thereof are contained in the carrier coat. In addition, it is preferable to set the total quantity of noble metals per the 1-liter volume of a honeycomb structure to 0.17 to 7.07 g.

A noble metal is contained in the oxidation catalyst for purification of exhaust gas of a gasoline engine or diesel engine. One or more kinds of elements selected from a group consisting of Pt, Rh, and Pd are preferable as this noble metal. In addition, it is preferable to set the total quantity of noble metals per the 1-liter volume of a honeycomb structure to 0.17 to 7.07 g. Further, the SCR catalyst for selective reduction of $NO_x$ contains at least one selected from a group consisting of a metal-substituted zeolite, vanadium, titania, tungsten oxide, silver, and alumina.

An alkali metal and/or an alkaline earth metal are contained in the $NO_x$ storage catalyst. The alkali metal may include K, Na, and Li. The alkaline earth metal may include Ca. In addition, it is preferable to set the total quantity of K, Na, and Li and Ca per the 1-liter volume of a honeycomb structure to 5 g or more.

The catalytic converter of the embodiment can be produced by carrying a catalyst on the aforementioned honeycomb structure according to a producing process based on a conventionally known method. Specifically, first, catalyst slurry containing a catalyst is prepared. Next, the catalyst slurry is coated on the surfaces of pores of partition walls of a honeycomb structure by methods such as a suction method. Thereafter, the catalytic converter can be produced by drying it under room temperature or heating conditions.

A process for producing a catalytic converter which is a ninth embodiment of the invention is a process for producing the catalytic converter which is the eighth embodiment, and a catalyst component is carried only on the portions which contact exhaust gas in one of the aforementioned honeycomb structures or a honeycomb structure obtained by one of the aforementioned processes for producing a honeycomb structure. By adopting such a configuration, cost reduction by a reduction in the amount to be used and concentration of a catalyst component at the interface between the outer wall and a bonding material can be prevented, and the suppression of generation of cracks originating on a concentration portion of the catalyst can be attained.

Further, during preparation of a bonded honeycomb segment body, there is also a problem in that imperceptible cracks (0.3 to 5 mm) which exceed partition wall thickness are generated in end face portions. As for the generation of cracks, cracks by generation of stress during drying or heat treatment, cracks caused by operator's handling, cracks by the application of pressure from the outside during preparation of a honeycomb segment bonded structure, etc., can be considered. Since the strength of ends of an outer circumferential wall of a honeycomb segment is improved by modifying the outer circumferential wall as described above, cracks caused by operator's handling during operations such as bonding, processing, inspection, and transfer can be suppressed. Since the strength of a part itself which is easily cracked is improved, generation of cracks can be suppressed even if stress is applied from the outside. Further, even if only the ends of the outer circumferential wall are modified with a view to suppressing generation of cracks of the end face portions, the same effect can be obtained.

EXAMPLES

Hereinafter, the invention will be described in more detail on the basis of Examples. However, the invention is by no means limited to these Examples.

[Preparation of Honeycomb Segment]

As a raw material for a honeycomb segment, there was prepared clay having plasticity by mixing a SiC powder and a metallic Si powder at a mass ratio of 80 to 20 to give a mixture and adding a pore former, an organic binder, a surfactant, and water to the mixture. The clay was subjected to extrusion forming and drying to obtain a formed honeycomb segment body having a partition wall thickness of 310 μm, a cell density of about 46.5 cells/cm$^2$ (300 cells/in$^2$), a square cross section of 35×35 mm, and a length of 152 mm. Plugging was alternately performed in a checkerboard pattern on both end faces of the formed honeycomb segment body. That is, plugging was performed in such a manner that adjacent cells were plugged at ends which are opposite each other. As the plugging material, the same material as the raw material for the honeycomb segment was used. After both the end faces of the cells are plugged and dried, the binder was degreased at about 400° C. under ambient atmosphere, and the honeycomb segment was fired at about 1450° C. in an Ar atmosphere to bond SiC crystal grains with Si. Thus, a honeycomb segment having a porous structure was obtained. Honeycomb segments having different properties such as porosity were prepared by changing the size and additive amount of a pore former to be added to clay. Further, a honeycomb segment A was subjected to heat treatment of 1250° C. in an oxygen-containing atmosphere, to prepare a honeycomb segment C. The properties of the obtained honeycomb segments are shown in Table 1.

TABLE 1 properties of Honeycomb Segment

|  | Porosity [%] | Average Pore Diameter [μm] | Thermal conductivity [W/mK] | Heat Capacity [kJ/K/m³] | Strength [MPa] |
|---|---|---|---|---|---|
| Honeycomb Segment A | 49.1 | 20.1 | 16.5 | 1016 | 22.1 |
| Honeycomb Segment B | 54.6 | 23.1 | 7.6 | 785 | 13.8 |
| Honeycomb Segment C | 51.2 | 21.5 | 16.6 | 1024 | 26.8 |

[Evaluation Method of Properties]

In addition, as for evaluation of properties, an evaluation method in an outer circumferential wall after modification, inner portions of outer circumferential wall, etc., can also be performed similarly.

Porosity: a flat plate with a partition wall thickness was cut out from a honeycomb segment and was measured by the Archimedes' method.

Average pore size: a predetermined shape (5×5×15 mm) was cut out from a honeycomb segment and was measured by a mercury porosimeter.

Thermal conductivity: a predetermined shape (10×10 mm) was cut out from a honeycomb segment and was measured by a laser-flash thermal constant measuring apparatus based on a method described in JIS R1611.

Heat capacity: the heat capacity of partition walls per unit volume was calculated by multiplying specific heat by bulk density.

Strength: a predetermined shape (0.3×4×40 mm) was cut out from a honeycomb segment and was measured by a three-point bending test based on JIS R1601.

[Modification of Honeycomb Segment Outer Circumferential Wall]

Example 1

150 mass part of SiC particles having a particle size of 2 μm, 150 mass parts of a colloidal silica solution (40% solid content), and 110 mass parts of water were added, and agitated well, thereby preparing slurry for modification. During preparation, a dispersant and an antifoaming agent was suitably added. The prepared slurry for modification was infiltrated into a sponge roller and was applied on four surfaces of the outer circumferential wall of the honeycomb segment A so as not to remain on the outer circumferential wall of the segment. Heat treatment of 700° C. was performed after drying, thereby obtaining a honeycomb segment whose outer circumferential wall was modified (Example 1). Next, the modified outer circumferential wall of the honeycomb segment was cut out into a predetermined shape, and its porosity, thermal conductivity, heat capacity, and strength were measured. Further, the ratio of the properties between the modified outer wall and a non-modified partition wall in porosity, thermal conductivity, heat capacity, and strength was found. Compositions of the prepared slurry and the properties of the outer wall of the segment after modification are shown in Table 2.

Example 2

The same procedure was employed as was done in Example 1 except that modification by a sponge roller was performed with very weak load, and the amount of a slurry component to be modified on a honeycomb segment was made small in Example 1. Compositions of the prepared slurry and the properties of the outer wall of the segment after modification are shown in Table 2.

Example 3

The same procedure was employed as was done in Example 1 except that 150 mass parts of water were added in Example 1. The composition of the prepared slurry and the properties of the outer wall of the segment after modification are shown in Table 2.

Example 4

The same procedure was employed as was done in Example 3 except that the number of times of modification by a sponge roller increases and that the amount of a slurry component to be modified on a honeycomb segment was made large in Example 3. The composition of the prepared slurry and the properties of the outer wall of the segment after modification are shown in Table 2.

Example 5

The same procedure was employed as was done in Example 1 except that 60 mass parts of a colloidal silica solution (40% of solid content), and 130 mass parts of water was added in Example 1. The composition of the prepared slurry and the properties of the outer wall of the segment after modification are shown in Table 2.

Example 6

The same procedure was employed as was done in Example 1 except that 10 mass parts of montmorillonite as an inorganic binder and 200 mass parts of water were added in Example 1. The composition of the prepared slurry and the properties of the outer wall of the segment after modification are shown in Table 2.

Example 7

The same procedure was employed as was done in Example 1 except that, in Example 1, 150 mass parts of SiC particles having a particle size of 0.3 μm and 170 mass parts of water were added. The composition of the prepared slurry and the properties of the outer wall of the segment after modification are shown in Table 2.

Example 8

The same procedure was employed as was done in Example 1 except that 150 mass parts of SiC particles having a particle size of 10 μm and 90 mass parts of water were added in Example 1. The composition of the prepared slurry and the properties of the outer wall of the segment after modification are shown in Table 2.

Example 9

The same procedure was employed as was done in Example 1 except that 150 mass parts of SiC particles having a particle size of 13 μm were added in Example 1. The composition of the prepared slurry and the properties of the outer wall of the segment after modification are shown in Table 2.

Example 10

The same procedure was employed as was done in Example 3 except that a honeycomb segment B was modified in Example 3. The composition of the prepared slurry and the properties of the outer wall of the segment after modification are shown in Table 2.

Example 11

The same procedure was employed as was done in Example 10 except that 170 mass parts of water were added in Example 10. The composition of the prepared slurry and the properties of the outer wall of the segment after modification are shown in Table 2.

Example 12

The same procedure was employed as was done in Example 10 except that 150 mass part of SiC particles having a particle size of 10 μm was added in Example 10. The composition of the prepared slurry and the properties of the outer wall of the segment after modification are shown in Table 2.

Example 13

The same procedure was employed as was done in Example 10 except that 150 mass parts of SiC particles having a particle size of 0.2 μm were added in Example 10. The composition of the prepared slurry and the properties of the outer wall of the segment after modification are shown in Table 2.

Example 14

The same procedure was employed as was done in Example 3 except that 150 mass parts of alumina particles having a particle size of 2 μm, 150 mass parts of a colloidal silica solution (40% solid content), and 150 mass parts of water were added and that modification was made using modifying slurry, which was agitated well, in Example 3. The composition of the prepared slurry and the properties of the outer wall of the segment after modification are shown in Table 2.

Example 15

The same procedure was employed as was done in Example 14 except that the number of times of modification by a sponge roller increases and that the amount of a slurry component to be modified on a honeycomb segment was made large in Example 14. The composition of the prepared slurry and the properties of the outer wall of the segment after modification are shown in Table 2.

Example 16

The same procedure was employed as was done in Example 3 except that heat treatment of 1250° C. was performed in an oxygen-containing atmosphere after drying of a honeycomb segment in Example 3. The composition of the prepared slurry and the properties of the outer wall of the segment after modification are shown in Table 2. The properties values of a non-modified partition wall were compared with the segment C, which was subjected to heat treatment of 1250° C. in an oxygen-containing atmosphere.

Example 17

The same procedure was employed as was done in Example 16 except that modification by a sponge roller was performed with very weak load and that the amount of a slurry component to be modified on a honeycomb segment was made small in Example 16. The composition of the prepared slurry and the properties of the outer wall of the segment after modification are shown in Table 2.

Example 18

The same procedure was employed as was done in Example 3 except that a honeycomb segment C was modified in Example 3. The composition of the prepared slurry and the properties of the outer wall of the segment after modification are shown in Table 2.

TABLE 2

Modification of outer walls of honeycomb segments and properties of outer walls after modification

| | Modifying Slurry (Mass Part) | | | properties of Modified Segments and Outer circumferential wall after Modification | | | |
|---|---|---|---|---|---|---|---|
| | Filling Particle (Particle size) | Inorganic Binder | Water | Segment Used | Porosity [%] | Porosity Ratio Modified/Non-modified | Thermal conductivity [W/m · K] |
| Example 1 | SiC (2 μm) 150 | Colloidal Silica 150 | 110 | Honeycomb Segment A | 43.8 | 0.89 | 19.4 |
| Example 2 | SiC (2 μm) 150 | Colloidal Silica 150 | 110 | Honeycomb Segment A | 48.1 | 0.98 | 16.8 |
| Example 3 | SiC (2 μm) 150 | Colloidal Silica 150 | 150 | Honeycomb Segment A | 42.1 | 0.85 | 20.7 |
| Example 4 | SiC (2 μm) 150 | Colloidal Silica 150 | 150 | Honeycomb Segment A | 29.5 | 0.60 | 24.8 |
| Example 5 | SiC (2 μm) 150 | Colloidal Silica 60 | 130 | Honeycomb Segment A | 46.9 | 0.96 | 18.5 |
| Example 6 | SiC (2 μm) 150 | Montmorillonite 10 | 200 | Honeycomb Segment A | 46 | 0.94 | 18.7 |
| Example 7 | SiC (0.3 μm) 150 | Colloidal Silica 150 | 170 | Honeycomb Segment A | 45.3 | 0.92 | 19.2 |

TABLE 2-continued

Modification of outer walls of honeycomb segments and properties of outer walls after modification

| | | | | | | | |
|---|---|---|---|---|---|---|---|
| Example 8 | SiC (10 μm) 150 | Colloidal Silica 150 | 90 | Honeycomb Segment A | 46.7 | 0.95 | 18.4 |
| Example 9 | SiC (13 μm) 150 | Colloidal Silica 150 | 110 | Honeycomb Segment A | 48.6 | 0.99 | 16.5 |
| Example 10 | SiC (2 μm) 150 | Colloidal Silica 150 | 150 | Honeycomb Segment B | 40.2 | 0.74 | 11.3 |
| Example 11 | SiC (2 μm) 150 | Colloidal Silica 150 | 170 | Honeycomb Segment B | 27.5 | 0.50 | 19.8 |
| Example 12 | SiC (10 μm) 150 | Colloidal Silica 150 | 150 | Honeycomb Segment B | 41.5 | 0.76 | 10.9 |
| Example 13 | SiC (0.2 μm) 150 | Colloidal Silica 150 | 150 | Honeycomb Segment B | 53.6 | 0.98 | 7.7 |
| Example 14 | $Al_2O_3$ (2 μm) 150 | Colloidal Silica 150 | 150 | Honeycomb Segment A | 41.5 | 0.85 | 19 |
| Example 15 | $Al_2O_3$ (2 μm) 150 | Colloidal Silica 150 | 150 | Honeycomb Segment A | 39.8 | 0.81 | 19.4 |
| Example 16 | SiC (2 μm) 150 | Colloidal Silica 150 | 150 | Honeycomb Segment A | 33.8 | 0.66 | 26.7 |
| Example 17 | SiC (2 μm) 150 | Colloidal Silica 150 | 150 | Honeycomb Segment A | 35.7 | 0.70 | 22.4 |
| Example 18 | SiC (2 μm) 150 | Colloidal Silica 150 | 150 | Honeycomb Segment C | 35.6 | 0.70 | 21.8 | properties of Modified Segments and Outer circumferential wall after Modification

| | Thermal conductivity Ratio Modified/Non-modified | Heat Capacity [kJ/K/m³] | Heat Capacity Ratio Modified/Non-modified | Strength [Mpa] | Strength Ratio Modified/Non-modified | Filling Particle size/Segment Pore Diameter |
|---|---|---|---|---|---|---|
| Example 1 | 1.18 | 1097 | 1.08 | 33 | 1.49 | 0.1 |
| Example 2 | 1.02 | 1024 | 1.01 | 22.9 | 1.04 | 0.1 |
| Example 3 | 1.25 | 1139 | 1.12 | 28.8 | 1.3 | 0.1 |
| Example 4 | 1.5 | 1357 | 1.34 | 41.5 | 1.88 | 0.1 |
| Example 5 | 1.12 | 1067 | 1.05 | 24.8 | 1.12 | 0.1 |
| Example 6 | 1.13 | 1069 | 1.05 | 25.6 | 1.15 | 0.1 |
| Example 7 | 1.16 | 1078 | 1.06 | 27.3 | 1.24 | 0.015 |
| Example 8 | 1.12 | 1071 | 1.05 | 25.1 | 1.14 | 0.498 |
| Example 9 | 1 | 1014 | 1 | 22.4 | 1.01 | 0.65 |
| Example 10 | 1.49 | 1045 | 1.33 | 18.5 | 1.34 | 0.087 |
| Example 11 | 2.65 | 1265 | 1.61 | 37.6 | 2.72 | 0.087 |
| Example 12 | 1.43 | 1013 | 1.29 | 18.2 | 1.32 | 0.43 |
| Example 13 | 1.01 | 803 | 1.02 | 14.1 | 1.02 | 0.0087 |
| Example 14 | 1.15 | 1192 | 1.17 | 30.1 | 1.36 | 0.1 |
| Example 15 | 1.18 | 1224 | 1.20 | 30.3 | 1.37 | 0.1 |
| Example 16 | 1.6 | 1353 | 1.32 | 57.4 | 2.14 | 0.093 |
| Example 17 | 1.35 | 1310 | 1.28 | 44.5 | 1.33 | 0.093 |
| Example 18 | 1.31 | 1343 | 1.31 | 29.5 | 1.1 | 0.093 |

Note) Since Examples 16 to 18 were subjected to heat treatment of 1250° C., characteristic values of Segment C were used for the segment of a non-modified body for comparison.

(Discussion)

As apparent from the results shown in Table 2, it can be understood that, by modifying the outer circumferential wall of a honeycomb segment, particles are filled into pores, the porosity is lowered compared with non-modified partition walls, and the thermal conductivity, heat capacity, and strength become large. Especially in the case where the porosity ratio of the modified and non-modified partition walls was 0.97 or less (Examples 1, 3 to 8, 10 to 12, and 14 to 18), the amounts of increase in thermal conductivity, heat capacity, and strength became large. In this case, the amounts of increase in thermal conductivity and strength became 1.1 or more times those of the non-modified partition walls, and the amount of increase in heat capacity became 1.05 or more times that of the non-modified partition walls.

Further, in the case where the amount of modification was little, and lowering of the porosity was little (Example 2, 9, 13), the increase in thermal conductivity, heat capacity and strength became little. In this case, the amounts of increase in thermal conductivity and strength were less than 1.1 times those of the non-modified partition walls, and the amount of increase in heat capacity was less than 1.05 times that of the non-modified partition walls.

Although the size of particles to be filled also depends on a segment to be modified, if the size was 0.3 to 10 μm, good filling could be made, and the decrease in porosity, the increase in the thermal conductivity, the increase in heat capacity, and the increase in strength were confirmed (Examples 1, 3 to 8, 10 to 12, 14 to 18). In a case where the particle size of particles to be filled was large (Example 9), particles to be filled could not sufficiently enter the segment (particles were filled only on the modified surface from cross-section view of microstructure), and the porosity was not reduced, the increase in thermal conductivity, heat capacity, and strength became little. As a result, the amounts of increase in thermal conductivity and strength were less than 1.1 times those of the non-modified partition walls, and the amount of increase in heat capacity was less than 1.05 times that of the non-modified partition walls.

On the other hand, in a case where the particle size of particles to be filled was small (Example 13), particles to be filled passed through the segment and were deposited in through channels. Therefore, the porosity of the outer circumferential wall was not reduced, and the increase in thermal conductivity, heat capacity, and strength became little. As a result, the amounts of increase in thermal conductivity and strength were less than 1.1 times those of the non-modified partition walls, and the amount of increase in heat capacity was less than 1.05 times that of the non-modified partition walls. From the above results, it can be understood that the particle size of the particles is preferably 1/100 to 1/2 of the pore diameter of the outer circumferential wall.

As apparent from the results shown in Table 2, it can be understood that, by modifying the outer circumferential wall of a honeycomb segment, particles are filled into pores, the porosity is lowered compared with non-modified partition walls, and the thermal conductivity, heat capacity, and strength become large. This is also the same in the case where a heat treatment of 800° C. to 1400° C. has bee performed, and it can be understood that, by modifying the outer circumferential wall of a honeycomb segment, particles are filled into pores, the porosity is lowered compared with non-modified partition walls which have been subjected to a heat treatment of 800° C. to 1400° C., and the thermal conductivity, heat capacity, and strength become large (Examples 16 and 17). Further, strength can be further increased by performing modification before the heat treatment (800° C. to 1400° C.) (Examples 17 and 18).

[Preparation of Bonding Material]

A bonding material was obtained by mixing SiC powder as inorganic particles, aluminosilicate fibers as oxide fibers, and a silica-sol aqueous solution as colloidal oxide, and clay, adding water, and performing kneading for 30 minutes using a mixer.

[Preparation of Honeycomb Structure]

A bonded honeycomb segment body was obtained by repeating the steps of coating the aforementioned bonding material on the outer circumferential wall surface of a honeycomb segment so as to be about 1 mm in thickness to form a bonding material layer and placing another honeycomb segment thereon, preparing a honeycomb segment stack composed of 16 honeycomb segments combined in 4×4, suitably applying pressure from the outside to bond the whole stack, and then drying the bonded stack for 2 hours at 120° C. Thereafter, the outer circumference of the bonded honeycomb segment body was cut into a cylindrical shape.

[Modification of Internal Partition Wall (Inner Portions of Outer Circumferential Wall)]

Example 19

150 mass parts of SiC particles having a particle size of 2 μm, 150 mass parts of a colloidal silica solution (40% solid content), and 110 mass parts of water were added, and agitated well, thereby preparing slurry for modification. During preparation, a dispersant and an antifoaming agent were suitably added (the same as the slurry for modification of Example 1). The outer circumference of a bonded honeycomb segment body composed of honeycomb segments A was processed into a predetermined shape, and the prepared slurry for modification was infiltrated into internal partition wall (inner portions of outer circumferential wall) contacting with a processed outer circumferential surface becoming an outermost circumference by a sponge roller. Heat treatment of 700° C. was performed after drying, thereby obtaining a bonded honeycomb segment body whose processed outer circumferential surface was modified (Example 19). Next, inner portions of outer circumferential wall were cut out into a predetermined shape from the modified bonded honeycomb segment body, and their porosity, thermal conductivity, heat capacity, and strength were measured. Further, the ratio of the properties between the modified inner portions of outer circumferential wall and non-modified partition walls in porosity, thermal conductivity, heat capacity, and strength was found. The composition of the prepared slurry and the properties of the inner portions of outer circumferential wall after modification are shown in Table 3.

Example 20

The same procedure was employed as was done in Example 19 except that 150 mass parts of water were added in Example 19. The composition of the prepared slurry and the properties of the inner portions of outer circumferential wall after modification are shown in Table 3.

Example 21

The same procedure was employed as was done in Example 20 except that the number of times of modification by a sponge roller was increased and that the amount of a slurry component to be modified on the inner portions of outer circumferential wall of a honeycomb segment was made large in Example 20. The composition of the prepared slurry and the properties of the inner portions of outer circumferential wall after modification are shown in Table 3.

Example 22

The same procedure was employed as was done in Example 19 except that 150 mass parts of SiC particles having a particle size of 0.3 μm and 170 mass parts of water were added in Example 19. The composition of the prepared slurry and the properties of the inner portions of outer circumferential wall after modification are shown in Table 3.

Example 23

The same procedure was employed as was done in Example 19 except that 150 mass parts of SiC particles having a particle size of 10 μm and 90 mass parts of water were added in Example 19. The composition of the prepared slurry and the properties of the inner portions of outer circumferential wall after modification are shown in Table 3.

Example 24

The same procedure was employed as was done in Example 20 except that internal partition walls (inner portions of outer circumferential wall) contacting with a processed outer circumferential surface whose outer circumference was processed into a predetermined shape in a bonded honeycomb segment body composed of honeycomb segments B were modified in Example 20. The composition of the prepared slurry and the properties of the inner portions of outer circumferential wall after modification are shown in Table 3.

Example 25

The same procedure was employed as was done in Example 24 except that 150 mass parts of SiC particles having a particle size of 10 μm were added in Example 24. The composition of the prepared slurry and the properties of the inner portions of outer circumferential wall after modification are shown in Table 3.

Example 26

The same procedure was employed as was done in Example 19 except that 150 mass parts of alumina particles having a particle size of 2 μm, 150 mass parts of a colloidal silica solution (40% solid content), and 150 mass parts of water were added and that modification was made using modifying slurry (the same as the slurry for modification of Example 14), which was agitated well, in Example 19. The composition of the prepared slurry and the properties of the outer wall of the segment after modification are shown in Table 3.

Especially in a case where filling could be made on the condition that the porosity ratio of the modified to non-modified partition walls was 0.97 or less, the thermal conductivity, heat capacity, and strength became large. In this case, the amounts of increase in thermal conductivity and strength became 1.1 or more times those of the non-modified partition walls, and the amount of increase in heat capacity became 1.05 or more times that of the non-modified partition walls.

Further, Examples 19 to 26 were carried out under the conditions with improvement effects of thermal conductivity, heat capacity, and strength from the result of the modification of the outer circumferential wall in Examples 1 to 18. For this reason, similarly to the outer wall modification, it can be understood that the particle size of particles to be filled is preferably $1/100$ to $1/2$ of the pore diameter of the outer circumferential wall.

TABLE 3

Modification of processed outer circumferential surface of honeycomb segments and characteristics of partition walls after modification

| | Modifying Slurry (Mass Part) | | | | properties of Modified Segments and Outer circumferential wall after Modification | | |
|---|---|---|---|---|---|---|---|
| | Filling Particle (Particle size) | Inorganic Binder | Water | Segment Used | Porosity [%] | Porosity Ratio Modified/Non-modified | Thermal conductivity [W/m · K] |
| Example 19 | SiC (2 μm) 150 | Colloidal Silica 150 | 110 | Honeycomb Segment A | 43.6 | 0.89 | 19.4 |
| Example 20 | SiC (2 μm) 150 | Colloidal Silica 150 | 150 | Honeycomb Segment A | 42.2 | 0.86 | 20.8 |
| Example 21 | SiC (2 μm) 150 | Colloidal Silica 150 | 150 | Honeycomb Segment A | 29.7 | 0.61 | 24.6 |
| Example 22 | SiC (0.3 μm) 150 | Colloidal Silica 150 | 170 | Honeycomb Segment A | 45.3 | 0.92 | 19 |
| Example 23 | SiC (10 μm) 150 | Colloidal Silica 150 | 90 | Honeycomb Segment A | 46.6 | 0.95 | 18.6 |
| Example 24 | SiC (2 μm) 150 | Colloidal Silica 150 | 150 | Honeycomb Segment B | 40.1 | 0.73 | 11 |
| Example 25 | SiC (10 μm) 150 | Colloidal Silica 150 | 150 | Honeycomb Segment B | 41.3 | 0.76 | 10.7 |
| Example 26 | $Al_2O_3$ (2 μm) 150 | Colloidal Silica 150 | 150 | Honeycomb Segment A | 41.4 | 0.84 | 18.9 |

| | properties of Modified Segments and Outer circumferential wall after Modification | | | | | |
|---|---|---|---|---|---|---|
| | Thermal conductivity Ratio Modified/Non-modified | Heat Capacity [kJ/K/m³] | Heat Capacity Ratio Modified/Non-modified | Strength [Mpa] | Strength Ratio Modified/Non-modified | Filling Particle size/Segment Pore Diameter |
| Example 19 | 1.18 | 1115 | 1.10 | 31.9 | 1.44 | 0.1 |
| Example 20 | 1.26 | 1132 | 1.11 | 29.2 | 1.32 | 0.1 |
| Example 21 | 1.49 | 1365 | 1.34 | 41.1 | 1.86 | 0.1 |
| Example 22 | 1.15 | 1069 | 1.05 | 27.3 | 1.24 | 0.015 |
| Example 23 | 1.13 | 1067 | 1.05 | 25.7 | 1.16 | 0.498 |
| Example 24 | 1.44 | 1045 | 1.33 | 18.6 | 1.35 | 0.087 |
| Example 25 | 1.41 | 1020 | 1.30 | 18.4 | 1.33 | 0.43 |
| Example 26 | 1.15 | 1191 | 1.17 | 29.6 | 1.34 | 0.1 |

(Discussion)

As apparent from the results shown in Table 3, similarly to the modification of the outer circumferential wall of a honeycomb segment, it can be understood that, even if internal partition wall (inner portions of outer circumferential wall) contacting with a processed outer circumferential surface of a bonded honeycomb segment body is modified, particles are filled into pores, the porosity is lowered compared with non-modified partition walls, and the thermal conductivity, heat capacity, and strength become large.

[Preparation of Honeycomb Structure]

Example 27

A honeycomb structure was obtained by repeating the steps of coating the aforementioned bonding material on the outer circumferential wall surface of the honeycomb segments (dried bodies) obtained in Example 2 so as to be about 1 mm in thickness to form a bonding material layer and placing another honeycomb segment thereon, preparing a honeycomb segment stack composed of 16 honeycomb segments combined in 4×4, suitably applying pressure from the outside to bond the whole stack, and then drying the bonded stack for 2 hours at 120° C. Thereafter, the outer circumference of the bonded honeycomb segment body was cut into a cylindrical shape. Next, a coating material (outer circumference coating material) was applied and was dried and cured for 2 hours at 700° C.

Example 28

A honeycomb structure was obtained in the same manner as was done in Example 27 except that, in Example 27, the honeycomb segments (dried bodies) obtained in Example 3 were used.

Example 29

A honeycomb structure was obtained by coating a coating material (outer circumference coating material) on the outer circumferential portion of a honeycomb segment structure in which internal partition walls (inner portions of outer circumferential wall) contacting with the processed outer circumferential surface obtained in Example 20 were modified, and drying it for 2 hours at 700° C.

Example 30

A bonded honeycomb segment body was obtained by repeating the steps of coating the aforementioned bonding material on the outer circumferential wall surface of the honeycomb segment (dried body) obtained in Example 3 so as to be about 1 mm in thickness to form a bonding material layer and placing another honeycomb segment thereon, preparing a honeycomb segment stack composed of 16 honeycomb segments combined in 4×4, suitably applying pressure from the outside to bond the whole stack, and then drying the bonded stack for 2 hours at 120° C. Thereafter, the outer circumference of the bonded honeycomb segment body was cut into a cylindrical shape. Next, the processed outer circumferential surface of the obtained bonded honeycomb segment body was modified by the method described in Example 20. After drying, a coating material (outer circumference coating material) was applied and was dried and cured for 2 hours at 700° C., whereby a honeycomb structure was obtained.

Example 31

A honeycomb structure was obtained in the same manner as was done in Example 27 except that the honeycomb segments (dried bodies) obtained in Example 4 were used in Example 27.

Example 32

A honeycomb structure was obtained in the same manner as was done in Example 30 except that, in Example 30, a bonded honeycomb segment body was prepared using the honeycomb segments (dried bodies) obtained in Example 7, that its outer circumference was processed, and that internal partition walls (inner portions of outer circumferential wall) contacting with the processed outer circumferential surface were modified by the method described in Example 22.

Example 33

A honeycomb structure was obtained in the same manner as was done in Example 27 except that, in Example 27, the honeycomb segments (dried bodies) obtained in Example 8 were used.

Example 34

A honeycomb structure was obtained in the same manner as was done in Example 30 except that a bonded honeycomb segment was prepared body using the honeycomb segments (dried bodies) obtained in Example 10, that its outer circumference was processed, and that inner portions of outer circumferential wall was modified by the method described in Example 24.

Example 35

A honeycomb structure was obtained in the same manner as was done in Example 27 except that, in Example 27, the honeycomb segments (dried bodies) obtained in Example 11 were used.

Example 36

A honeycomb structure was obtained in the same manner as was done in Example 27 except that, in Example 27, the honeycomb segments (dried bodies) obtained in Example 12 were used.

Example 37

A honeycomb structure was obtained in the same manner as was done in Example 30 except that a bonded honeycomb segment body was prepared using the honeycomb segments (dried bodies) obtained in Example 13, that its outer circumference was processed, and that inner portions of outer circumferential wall were modified with slurry of the same composition as Example 13.

Example 38

A honeycomb structure was obtained in the same manner as was done in Example 30 except that, in Example 30, a bonded honeycomb segment body was prepared using the honeycomb segments (dried bodies) obtained in Example 14, that its outer circumference was, and that inner portions of outer circumferential wall were modified with slurry of the same composition as Example 26.

Example 39

A honeycomb structure was obtained in the same manner as was done in Example 27 except that, in Example 27, the honeycomb segments (bodies subjected to heat treatment of 1250° C.) obtained in Example 17 were used.

Example 40

A honeycomb structure was obtained in the same manner as was done in Example 30 except that, in Example 30, a bonded honeycomb segment body was prepared using the honeycomb segments (bodies subjected to heat treatment of 1250° C.) obtained in Example 17, that its outer circumference was processed, and that inner portions of outer circumferential wall were modified with slurry of the same composition as Example 20.

Example 41

A honeycomb structure was obtained in the same manner as was done in Example 30 except that, in Example 30, a bonded honeycomb segment body was prepared using the honeycomb segments (dried bodies) obtained in Example 18, that its outer circumference was processed, and that inner portions of outer circumferential wall were modified with slurry of the same composition as Example 20.

Comparative Example 1

A honeycomb structure was obtained in the same manner as was done in Example 27 except that, in Example 27, the non-modified honeycomb segments A were used.

Comparative Example 2

A honeycomb structure was obtained in the same manner as was done in Comparative Example 1 except that, in Comparative Example 1, the non-modified honeycomb segments B were used.

Comparative Example 3

A honeycomb structure was obtained in the same manner as was done in Comparative Example 1 except that, in Comparative Example 1, the non-modified honeycomb segments C were used.

[Preparation of Catalyst-Carrying Honeycomb Structure]

Carrying of a catalyst component was performed on the honeycomb structures of Examples 27, 28, 30, 32, 34, 35, 38, 40, and 41 and Comparative Examples 1 to 3.

The catalyst slurry was prepared by adding $Al_2O_3$ sol and water to a $\gamma$-$Al_2O_3$ catalyst carrying Pt, and $CeO_2$ powder (co-catalyst). Catalyst-carrying honeycomb structures were obtained by carrying the catalyst slurry on honeycomb structures by wash coating such that Pt component become 1.06 g/L and heat-treating at 600° C. after drying.

[Evaluation of Honeycomb Structure]

The obtained honeycomb structures were evaluated by a rapid heating test (burner spalling test). By making the air heated to a given temperature by a burner flow to the honeycomb structures, temperature differences between central portions and outside portions were caused, and thermal shock resistances of the honeycomb structures were evaluated. The test was performed up to a temperature at which cracks are generated by sequentially raising the temperature to be heated by the burner. It can be observed that, the higher the temperature at which cracks are generated, the higher the thermal shock resistance is.

As for the honeycomb structures which carry a catalyst, the microstructure of a bonding interface and an outer circumference coating interface was observed by an SEM/EDS after the test, and the existence/nonexistence of a catalyst concentration layer was confirmed. The evaluation results of the honeycomb structures are shown in Table 4.

TABLE 4

Preparation of Honeycomb Segment Structure and Evaluation Results

| | | Preparation of Honeycomb Structure | | | | | Results of Rapid Heating Test | | |
|---|---|---|---|---|---|---|---|---|---|
| | | Modification of Outer Circumferential Wall of Segment | | Modification of Processed outer circumferential surface | | | Maximum Temperature | Existence of Microstructure/Catalyst Concentration Layer | |
| | Segment Used | Existence of Modification | Composition of Modifying Material | Existence of Modification | Composition of Modifying Material | Existence of Carrying of Catalyst | with No Generation of Crack | Bonded Layer Interface | Outer Circumferential Coat Layer Interface |
| Example 27 | Honeycomb Segment A | Yes | Example 2 | | | Yes | 800° C. | Yes | Yes |
| Example 28 | Honeycomb Segment A | Yes | Example 3 | | | Yes | 1000° C. | None | Yes |
| Example 29 | Honeycomb Segment A | | | Yes | Example 20 | | 900° C. | | |
| Example 30 | Honeycomb Segment A | Yes | Example 3 | Yes | Example 20 | Yes | 1100° C. | None | None |
| Example 31 | Honeycomb Segment A | Yes | | | | | 1100° C. | | |
| Example 32 | Honeycomb Segment A | Yes | Example 7 | Yes | Example 22 | Yes | 950° C. | None | None |
| Example 33 | Honeycomb Segment A | Yes | Example 8 | | | | 900° C. | | |
| Example 34 | Honeycomb Segment B | Yes | Example 10 | Yes | Example 24 | Yes | 900° C. | None | None |
| Example 35 | Honeycomb Segment B | Yes | Example 11 | | | Yes | 950° C. | None | Yes |
| Example 36 | Honeycomb Segment B | Yes | Example 12 | | | | 850° C. | | |
| Example 37 | Honeycomb Segment B | Yes | Example 13 | Yes | Example 13 | | 700° C. | | |
| Example 38 | Honeycomb Segment A | Yes | Example 14 | Yes | Example 26 | Yes | 1100° C. | None | None |
| Example 39 | Honeycomb Segment A | Yes | Example 17 | | | | 1100° C. | | |
| Example 40 | Honeycomb Segment A | Yes | Example 17 | Yes | Example 20 | Yes | 1150° C. | None | None |

TABLE 4-continued

Preparation of Honeycomb Segment Structure and Evaluation Results

| | Segment Used | Preparation of Honeycomb Structure | | | | | Results of Rapid Heating Test | | |
|---|---|---|---|---|---|---|---|---|---|
| | | Modification of Outer Circumferential Wall of Segment | | Modification of Processed outer circumferential surface | | | Maximum Temperature with No Generation of Crack | Existence of Microstructure/Catalyst Concentration Layer | |
| | | Existence of Modification | Composition of Modifying Material | Existence of Modification | Composition of Modifying Material | Existence of Carrying of Catalyst | | Bonded Layer Interface | Outer Circumferential Coat Layer Interface |
| Example 41 | Honeycomb Segment A | Yes | Example 18 | Yes | Example 20 | Yes | 1000° C. | None | None |
| Comparative Example 1 | Honeycomb Segment A | | | | | Yes | 800° C. | Yes | Yes |
| Comparative Example 2 | Honeycomb Segment B | | | | | Yes | 700° C. | Yes | Yes |
| Comparative Example 3 | Honeycomb Segment C | | | | | Yes | 900° C. | Yes | Yes |

(Discussion)

As apparent from the results described in Table 4, it can be understood that the temperature of generation of cracks during the rapid heating test becomes high by performing modification of outer circumferential wall or modification of processed outer circumferential surface (Examples 28 to 36 and 38 to 41). Further, in the case of the honeycomb segment A, the temperature at which cracks are generated was raised to 900 to 1150° C. (Examples 28 to 33 and 38 to 41) from 800° C. of the non-modified honeycomb structure (Comparative Example 1).

It can be understood that, even in the case of the honeycomb segment B, the temperature at which cracks are generated was raised to 850 to 900° C. (Examples 34 to 36) from 700° C. (Comparative Example 2). The enhancement in the temperature at which cracks are generated is influenced by a modified portion. Although the outer circumferential wall or inner portions of outer circumferential wall have an effect on suppression of generation of cracks in themselves, and the temperature at which cracks are generated becomes high, it can be understood that it is more effective to modify the outer circumferential wall and the inner portions of outer circumferential wall (for example, see Examples 28 to 30 and Comparative Example 1).

The enhancement in the temperature at which cracks are generated is influenced by the modification situation of a modified portion. In the case of honeycomb segments in which sufficient filling could be made, the temperature at which cracks are generated became higher (Examples 28, 30, 31, 35, and 38 to 41). In a case where sufficient filling could not be performed (Examples 27 and 37), even if honeycomb segments were modified, the depression effect of generation of cracks was low.

From such a viewpoint, it can be understood that the porosity, thermal conductivity, heat capacity, and strength which exhibit effects have preferable ranges as specified in the invention.

Further, as apparent from the results described in Table 4, it can be understood that, even if heat treatment (800° C. to 1400° C.) has been performed after modification of outer circumferential wall, the temperature of generation of cracks during the rapid heating test becomes high (Examples 39 and 40). Moreover, the temperature at which cracks are generated was raised to 1100 to 1150° C. from 900° C. of the non-modified honeycomb structure (Comparative Example 3). Further, since the strength of outer circumferential wall is further improved by performing heat treatment of 800° C. to 1400° C. after modification of the outer circumferential wall, the temperature of generation of cracks became higher (Examples 40 and 41).

Next, the effect of preventing permeation and concentration of a catalyst can be confirmed by microstructure observation after the test. As a result of the microstructure observation, a filling composition was filled in the vicinity of the surfaces of outer circumferential wall or in the vicinity of the surfaces of internal partition wall (inner portions of outer circumferential wall) contacting with a processed outer circumferential surface. Thus, a catalyst concentration layer was not confirmed at the inside of a bonding material, the interface between the bonding material and the outer circumferential wall of a honeycomb segment, the inside of an outer circumferential coat layer, and the interface between the outer circumferential coat layer and a segment becoming an outer circumference through processing.

Example 42

When twenty honeycomb structures were prepared by the method of Comparative Example 3, the number of generation of imperceptible cracks of 0.3 to 5 mm at the ends of the honeycomb structures was five (5/20). When twenty honeycomb structures were prepared by the method of Example 39, the number of generation of imperceptible cracks of 0.3 to 5 mm at the ends of the honeycomb structures was zero (0/20).

Next, a honeycomb segment was obtained in the same manner as was done in Example 17 except that, in Example 17, slurry for modification was infiltrated into four surfaces of the outer circumferential wall of 10 mm from both end surfaces of the honeycomb segment A by a sponge roller and was coated so as not to remain on the outer circumferential wall of the segment. The porosity and strength of the outer circumferential wall of the honeycomb segment modified at this time showed the same values as Example 17. When twenty honeycomb structures were prepared by the same method as in Example 39 using this honeycomb segment, the number of generation of imperceptible cracks of 0.3 to 5 mm at the ends of the honeycomb structures was zero (0/20).

(Discussion)

It can be understood that, generation of imperceptible cracks in the honeycomb structures end can be prevented by modifying the outer circumferential wall of the honeycomb segment. Accordingly, it can be understood that, even if only the ends of outer circumferential wall were modified with a view to preventing generation of imperceptible cracks at the ends of a honeycomb structure, the same effect can be obtained.

INDUSTRIAL APPLICABILITY

The honeycomb structure of the invention is effectively used as a trapping filter for exhaust gas, for example, a diesel particulate filter (DPF) for trapping and removing particulate matter (particulates) contained in exhaust gas from a diesel engine or the like.

The invention claimed is:

1. A honeycomb segment having a part of a whole shape constituting a honeycomb structure that is composed of a plurality of cells that extend from a first face of the honeycomb structure to a second face of the honeycomb structure, the segment comprising:
    inner partition walls that, at least in part, define each of the cells and contain a number of first pores therein, the first pores being configured to filter the exhaust gas;
    an outer circumferential wall containing a number of second pores therein and being provided so as to surround the inner partition walls; and
    a filling composition that is only disposed in and fills the second pores located on outer and inner surfaces of the outer circumferential wall and the second pores located in internal portions of the outer circumferential wall, wherein
    the filling composition contains particles of a particle size configured to penetrate an inside of the second pores of the outer circumferential wall and a binder configured to (1) bind the particles to the inside of the second pores of the outer circumferential wall and/or (2) bind the particles disposed inside the second pores of the outer circumferential wall to each other,
    there are no cells extending from the first face to the second face of the honeycomb structure that are completely formed by the outer circumferential wall, and
    the honeycomb segment is capable of forming the honeycomb structure by integrally bonding the honeycomb segment with a bonding material.

2. The honeycomb segment according to claim 1, wherein the filling composition is disposed at only ends of the outer circumferential wall.

3. The honeycomb segment according to claim 1, wherein the particle size of the particles is 1/100 to 1/2 of a pore diameter of the outer circumferential wall.

4. The honeycomb segment according to claim 1, wherein the binder exhibits a binding force by heat treatment of 800° C. or less.

5. The honeycomb segment according to claim 1, wherein a porosity of the outer circumferential wall is smaller than a porosity of the inner partition walls.

6. The honeycomb segment according to claim 1, wherein a thermal conductivity of the outer circumferential wall is larger than a thermal conductivity of the inner partition walls.

7. The honeycomb segment according to claim 1, wherein a heat capacity of the outer circumferential wall is larger than a heat capacity of the inner partition walls.

8. The honeycomb segment according to claim 1, wherein a bending strength of the outer circumferential wall is larger than a bending strength of the inner partition walls.

9. The honeycomb segment according to claim 1, wherein each cell is plugged at one end so that the exhaust gas flows through the inner partition walls.

10. A honeycomb structure being formed by bonding integrally honeycomb segments according to claim 1, each of which has a part of the whole shape constituting the honeycomb structure by means of the bonding material and of which the outer circumference of the bonded body is processed into a predetermined shape, the honeycomb structure comprising the inner partition walls containing the number of the first pores and defining the plurality of cells, the outer circumferential wall having the number of the second pores and surrounding the inner partition walls, and an internal partition wall having a number of third pores and contacting with a processed outer circumferential surface becoming an outermost circumference through processing of an outer circumferential portion,
    wherein the filling composition containing the particles of the particle size configured to penetrate the inside of the second pores, and the binder configured to (1) bind the particles to the inside of the second pores of the outer circumferential wall and/or (2) bind the particles together is disposed inside the second pores at the whole or ends of the outer circumferential wall, and a filling composition containing particles of a particle size configured to penetrate an inside of the third pores and a binder configured to (1) bind the particles to the inside of the third pores of the inner portions of the outer circumferential wall and/or (2) bind the particles disposed inside the third pores of the internal partition wall together is disposed inside the third pores of the internal partition wall.

11. A process for producing a honeycomb segment according to claim 1, the process comprising disposing, inside the second pores at the whole or ends of the outer circumferential wall of a formed body or fired body obtained by forming kneaded clay into the honeycomb segment with a predetermined shape or by firing the obtained formed body, the filling composition containing the particles of the particle size configured to penetrate the inside of the second pores and the binder configured to (1) bind the particles to the inside of the second pores of the outer circumferential wall and/or (2) bind the particles disposed inside the second pores of the outer circumferential wall together.

12. The process for producing a honeycomb segment according to claim 11,
    wherein a heat treatment is performed within a temperature range of 800 to 1400° C. under an oxygen and steam containing atmosphere during the disposition of the filling composition.

13. A honeycomb structure being formed by bonding integrally honeycomb segments each of which has a part of a whole shape constituting the honeycomb structure by means of a bonding material creating a bonded body and of which an outer circumference of the bonded body is processed into a predetermined shape, the honeycomb structure comprising:
    inner partition walls containing a number of first pores and defining a plurality of cells serving as flow channels for exhaust gas between two end faces, the first pores being configured to filter the exhaust gas;
    outer circumferential walls having a number of second pores and surrounding the inner partition walls;

an internal partition wall having a number of third pores and including portions of the inner partition walls that contact a processed outer circumferential surface becoming an outermost circumference through processing of an outer circumferential portion;

a filling composition that is disposed in and fills the second pores and the third pores located on outer and inner surfaces of the outer circumferential wall and the internal partition wall, respectively, and the second pores and the third pores located in internal portions of the outer circumferential wall and the internal partition wall, respectively, wherein the filling composition contains particles of a particle size configured to penetrate into the third pores, and a binder configured to (1) bind the particles and an inside of the third pores of the outer circumferential wall and/or (2) bind the particles together that are disposed inside the third pore.

14. A process for producing the honeycomb structure according to claim 13, comprising forming kneaded clay into the shape of a honeycomb segment or firing the obtained formed body, integrally bonding the formed body or fired body serving as the obtained honeycomb segment, processing the outer circumference of the obtained bonded body into a predetermined shape, and then disposing inside the third pores of the inner portions of the outer circumferential wall the filling composition containing the particles of the particle size configured to penetrate into the third pores and the binder configured to (1) bind the particles and the inside of the third pores of the inner portions of the outer circumferential wall and/or (2) bind the particles together that are disposed inside the third pore.

15. A process for producing the honeycomb structure according to claim 10, the honeycomb structure being formed by bonding integrally the honeycomb segments and disposing the filling composition containing the particles of the particle size the inside of the second pores, and the binder configured to (1) bind the particles to the inside of the second pores of the outer circumferential wall and/or (2) bind the particles disposed inside the second pores together inside the second pores at the whole or ends of the outer circumferential wall, and the filling composition containing the particles of the particle size configured to penetrate the inside of the third pores and the binder configured to (1) bind the particles to the inside of the third pores of the internal partition wall and/or (2) bind the particles disposed inside the third pores together inside the third pores of the internal partition wall.

16. A catalytic converter in which a catalyst component is carried on the honeycomb structure according to claim 13, wherein the catalyst component is absent in the inside of the bonding material, the interface between the bonding material and the honeycomb segment, the inside of the outer circumferential coat layer, and the interface between the outer circumferential coat layer and a segment becoming an outer circumference through processing.

17. A catalytic converter in which a catalyst component is carried on the honeycomb structure according to claim 10, wherein the catalyst component is absent in the inside of the bonding material, the interface between the bonding material and the honeycomb segment, the inside of the outer circumferential coat layer, and the interface between the outer circumferential coat layer and a segment becoming an outer circumference through processing.

* * * * *